US012598097B2

(12) United States Patent
Vad-Miller

(10) Patent No.: US 12,598,097 B2
(45) Date of Patent: Apr. 7, 2026

(54) SPARSE TRANSMITTER FINITE IMPULSE RESPONSE EQUALIZER

(71) Applicant: Mellanox Technologies, Ltd., Illit (IL)

(72) Inventor: Bjarke Vad-Miller, Roskilde (DK)

(73) Assignee: Mellanox Technologies, Ltd., Yokneam (IL)

( * ) Notice: Subject to any disclaimer, the term of this patent is extended or adjusted under 35 U.S.C. 154(b) by 174 days.

(21) Appl. No.: 18/639,729

(22) Filed: Apr. 18, 2024

(65) Prior Publication Data

US 2025/0330347 A1      Oct. 23, 2025

(51) Int. Cl.
 H04L 25/03       (2006.01)
 H04B 1/04        (2006.01)
(52) U.S. Cl.
 CPC ..... H04L 25/03057 (2013.01); H04B 1/0475 (2013.01)
(58) Field of Classification Search
 CPC ......... H04L 25/03057; H04L 25/03343; H04L 25/03885; H04B 1/0475
 See application file for complete search history.

(56) References Cited

U.S. PATENT DOCUMENTS

| | | | | | |
|---|---|---|---|---|---|
| 8,743,945 | B2 * | 6/2014 | Aziz | ........................ | H04L 25/14 |
| | | | | | 370/335 |
| 8,848,774 | B2 * | 9/2014 | Zhong | ............... | H04L 25/03343 |
| | | | | | 375/232 |
| 9,025,655 | B1 * | 5/2015 | Ramadoss | ......... | H04L 25/03343 |
| | | | | | 375/232 |
| 2013/0230092 | A1 * | 9/2013 | Prokop | ............. | H04L 25/03044 |
| | | | | | 375/232 |
| 2013/0230093 | A1 * | 9/2013 | Aziz | ................. | H04L 25/03885 |
| | | | | | 375/233 |

* cited by examiner

*Primary Examiner* — Vineeta S Panwalkar
(74) *Attorney, Agent, or Firm* — Carnelian Law, LLC

(57)        ABSTRACT

Data transceivers including a transmitter configured with a digital filter, and a receiver configured with an equalizer, are equipped with logic to measure a combined pulse response to a symbol generated by the transmitter at an output of the equalizer, adjust the combined pulse response by an impulse response of the digital filter to generate an adjusted pulse response, and modify the digital filter with one or more floating taps based on the adjusted pulse response.

20 Claims, 15 Drawing Sheets

RESPONSE
AMPLITUDE pre-cursor
distortion
due to ISI post-cursor distortion due to ISI

TIME (IN UI)

main cursor
(t=0)

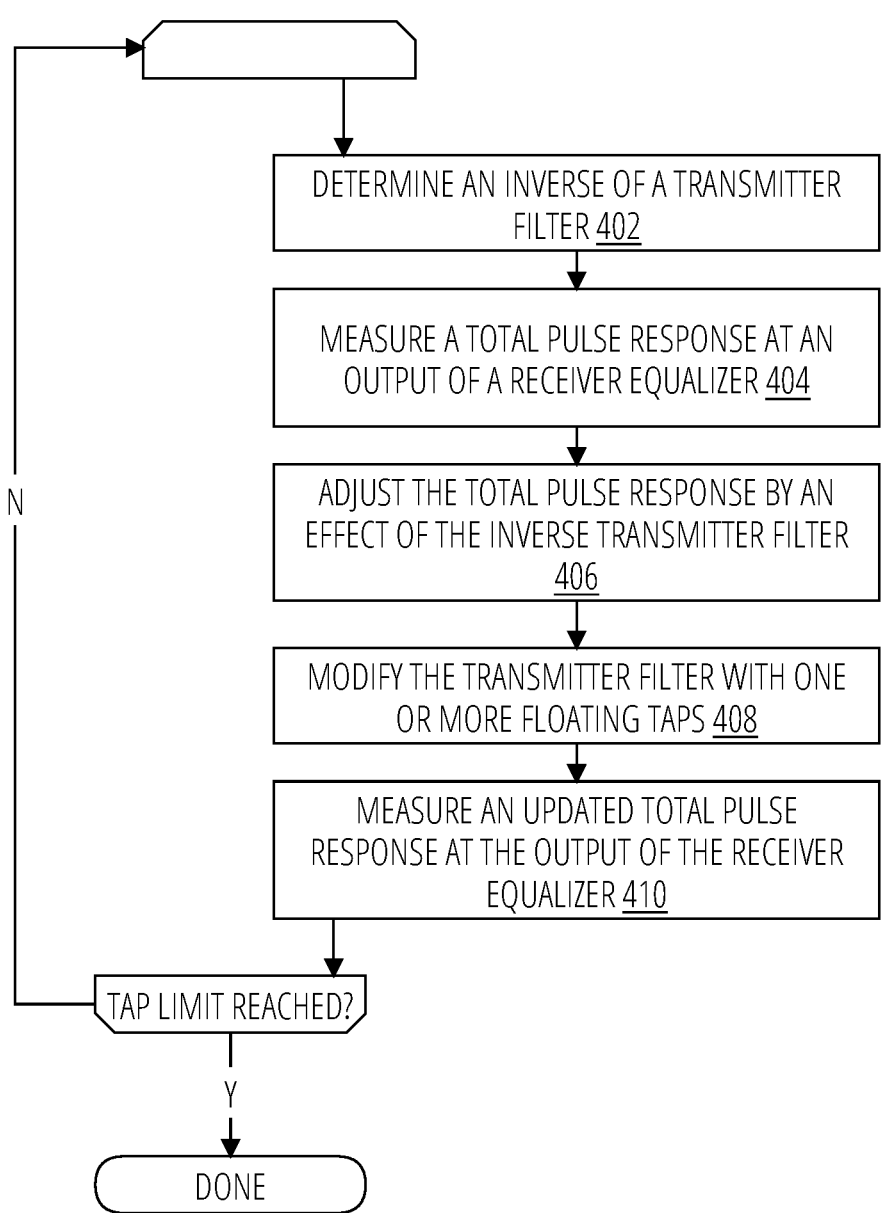

DETERMINE AN INVERSE OF A TRANSMITTER FILTER 402

MEASURE A TOTAL PULSE RESPONSE AT AN OUTPUT OF A RECEIVER EQUALIZER 404

ADJUST THE TOTAL PULSE RESPONSE BY AN EFFECT OF THE INVERSE TRANSMITTER FILTER 406

MODIFY THE TRANSMITTER FILTER WITH ONE OR MORE FLOATING TAPS 408

MEASURE AN UPDATED TOTAL PULSE RESPONSE AT THE OUTPUT OF THE RECEIVER EQUALIZER 410

TAP LIMIT REACHED?

N

Y

DONE

FIG. 4

CANDIDATE TAP GROUP SEQUENCE
ALLOCATIONS FOR P=5

INSTRUCTION CACHE 1302

SCHEDULER UNIT 1304 (K)

DISPATCH 1318

REGISTER FILE 1306

CORE 1308 (L-1)

SFU 1310 (M-1)

LSU 1312 (N-1)

INTERCONNECT NETWORK 1314

SHARED MEMORY/L1 CACHE 1316

TO/FROM
MMU 1110

1600

INPUT DATA
1620

DATA ASSEMBLY 1604

VERTEX SHADING 1606

PRIMITIVE ASSEMBLY 1608

GEOMETRY SHADING 1610

VIEWPORT SCC 1612

RASTERIZATION 1614

FRAGMENT SHADING 1616

RASTER OPERATIONS 1618

OUTPUT
DATA 1602

SPARSE TRANSMITTER FINITE IMPULSE RESPONSE EQUALIZER

BACKGROUND

High-speed data transmission in data centers and between computing and storage devices may be implemented over electrical and/or optical channels. The channels may carry modulated waveforms that represent the bits, for example utilizing Pulse Amplitude Modulation (PAM). Signal integrity on the channel may be compromised by noise, jitter, linear distortion known as Inter Symbol Interference (ISI), and non-linear distortion, for example.

Inter-symbol interference when symbols sent over a channel interfere with each one another, for example due to reflections. ISI interference may lead to difficulties in correctly interpreting the transmitted symbols at the receiver end, as one (or more) symbol's influence affects the form of other symbols. To mitigate ISI, various equalization techniques, such as linear equalization and decision feedback equalization, may be employed.

The hardware logic utilized to mitigate ISI is often constrained in its complexity due to power and area limitations. Furthermore, modern communication channels often comprise multiple segments that may introduce ISI. Circumstances may arise during operation of a channel where there are many more reflections than what may be adequately compensated for by the limited number of preset taps utilized in a transmitter-side ISI filter.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 depicts an iterative configuration process for a transmitter filter in one embodiment.

FIG. 9 depicts possible combinations for sequentially placing P=5 floating taps in adjacent groupings.

DETAILED DESCRIPTION

Figure 1:
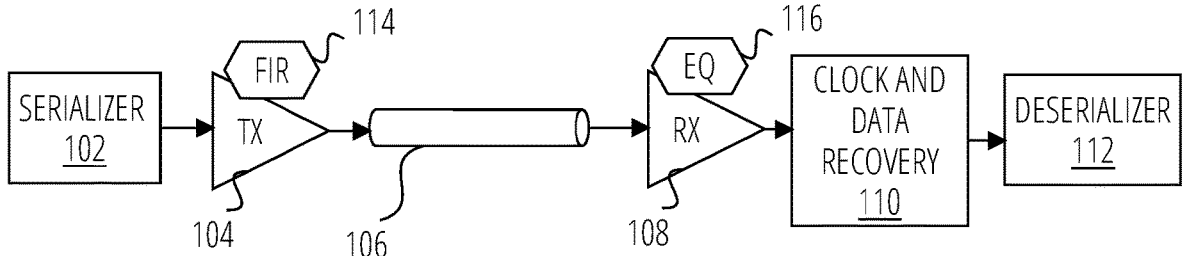
FIG. 1 depicts a communication system in one embodiment.

FIG. 1 depicts a communication system (e.g., a data transceiver) in one embodiment. The system comprises a serializer 102 that provides data to transmit as a sequence of symbol values to a transmitter 104. A transmitter 104 communicates the symbols over a communication link 106 to a receiver 108, where clock and data recovery 110 is applied before the data is recovered using a deserializer 112.

The transmitter 104 comprises a FIR filter 114 to perform pre-distortion on the symbols to communicate, to compensate for ISI distortion that occurs in the communication link 106.

The receiver 108 may apply an equalizer 116 to the signals received over the communication link 106. For example in some embodiments the receiver 108 may perform Continuous Time Linear Equalization (CTLE) on the received signals. CTLE is a signal processing technique utilized in high-speed serial communication systems to compensate for transmission medium distortions such as ISI.

In other embodiments the receiver 108 may perform Decision Feedback Equalization (DFE) on the received signals to mitigate ISI distortion. Unlike linear equalization methods, which apply a fixed or adaptive filter across the entire signal spectrum, DFE uses decisions made about previous bits to subtract estimated ISI from the current bit being decided. DFE mechanisms may utilize a Feedforward Equalizer (e.g., a linear filter) to partially equalize the incoming signal, followed by a Feedback Filter that applies the decisions made about previous bits to generate an estimate of the ISI contributed by those bits to the current symbol. The DFE then subtracts the estimated ISI from the current symbol before making a decision on its value.

A finite impulse response (FIR) filter is a type of equalizer that operates on a finite span of input symbols (e.g., voltage pulses) to produce a corresponding span of output symbols. A FIR filter may be configured to convolve the input data with a finite-duration impulse response, which may be implemented by a set of filter coefficients on various delayed versions of the unit interval signal. These coefficients dictate the filter's behavior, affecting its frequency response and shaping its output.

Figure 2:
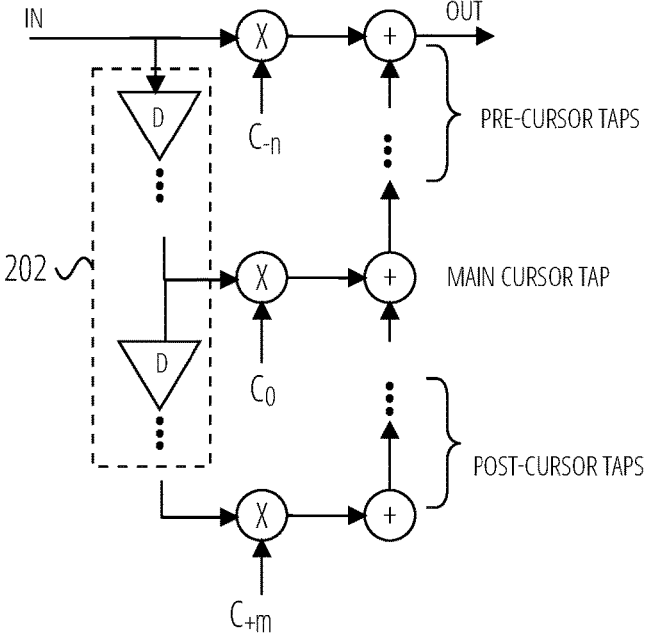
FIG. 2 depicts exemplary finite impulse response (FIR) filter logic.

FIG. 2 depicts exemplary FIR filter logic. The FIR filter transforms an input signal (IN) into an output signal (OUT). The FIR filter comprises a memory 202 that taps the input signal at various stages of delay (D). In some implementations, each delay is one unit interval of the input signal, although this need not be the case in general. At each tap the input signal is scaled by a coefficient value and accumulated into the final output signal.

Tap locations may be referred to as 'cursors'. The tap location (unit interval ordinal delay value) at which the strongest impulse response occurs may be referred to as the 'main cursor'. Tap locations with less delay than the main cursor may be referred to a 'pre-cursors'. Tap locations with more delay than the main cursor may be referred to a 'post-cursors'.

Some FIR filter implementations comprise a number of taps wherein the signal input delay for some taps is selected freely or with some restrictions from a range of candidate delay values. The configuration of the tap weights and delays for such an equalizer may be challenging compared to a traditional FIR filter in which each tap input is produced by subsequent unit interval delays of the input signal.

In so-called 'sparse' filters the delay between taps may be more than one unit interval, which may be understood as some coefficients at unit interval delays being set to zero (the taps at these locations being effectively non-contributive to the filter output).

Due to the fewer number of taps over a given range of unit interval delays, sparse digital filters require fewer mathematical operations (such as multiplications and additions) for each output sample calculation than do densely-tapped filter structures. This results in a more efficient use of computational and memory resources, making sparse filters attractive for systems operating at high bandwidth, limited processing power, and/or low-power consumption.

The sparsity also enables these filters to be tailored in some applications to emphasize or detect specific signal features while ignoring others. The implementation of sparse filters may involve the use of algorithms to determine the most effective tap locations and values of the non-zero coefficients for these taps for the intended application.

In practice, sparse FIR filters may be implemented efficiently in known manners using for example flip-flops or latches for the delay elements, multiplexers to select the tap locations (e.g., flops or latches) utilized in the filter, and arithmetic and memory logic to generate and store the filter coefficients. The FIR-configuration algorithms herein may be implemented as circuitry and other logic that generates settings for the tap locations (e.g., selection settings to the multiplexers) and determines and stores the filter coefficients to calibrate a communication channel with pre-distortion (transmitter-side distortion) on communicated symbols, to compensate for channel and other post-transmitter distortions, for example distortion due to ISI reflections.

Preset taps are those taps with pre-configured (prior to calibration) delays and coefficients. Floating taps have their delays and/or coefficients determined and set during calibration. Preset taps may for example be set based on metrics that are somewhat independent of the channel's physical characteristics, and are commonly set at unit intervals adjacent to or near the main cursor. Placing a tap means setting its delay. Setting a tap means assigning a placed tap with a coefficient.

Figure 3:
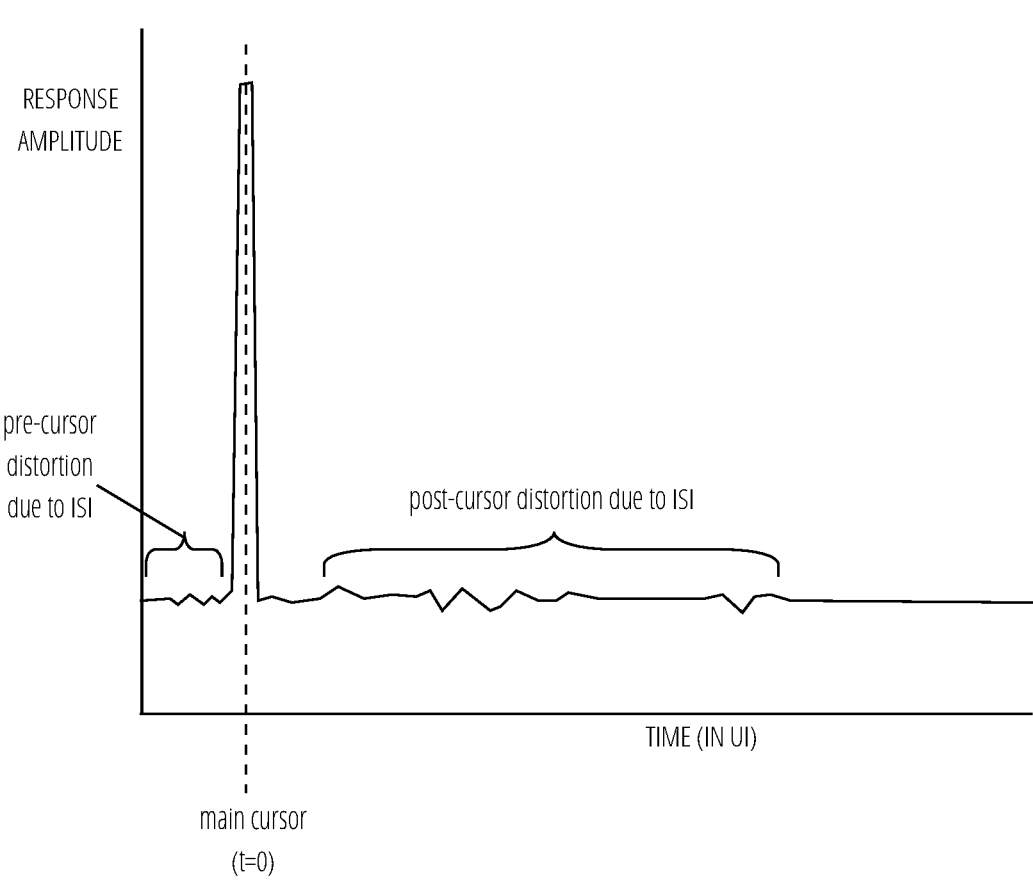
FIG. 3 depicts an example of a time-domain pulse response of a communication link.

FIG. 3 depicts an example of a time-domain pulse response of a communication link. The strongest response occurs in or approximately in the same unit interval as the pulse signal itself. Ripples (distortion) due to reflections from other signals may occur before and after the main cursor. Ripples before the unit interval of the main cursor are referred to pre-cursor distortions and ripples after the unit interval of the main cursor are referred to as post-cursor distortions. A FIR filter in the transmitter may be utilized to introduce pre-transmission distortions into communicated symbols to cancel/remove both pre- and post-cursor distortions on a given communication link by appropriate configuration of tap locations and tap settings.

Disclosed herein are mechanisms for tap delay selection and coefficient (i.e., weight) configuration in sparse transmitter-side finite impulse response (FIR) filters. These mechanisms may compensate for inter-symbol interference (ISI) arising, for example, from reflections in the channel, while satisfying design constraints on hardware size and complexity. A transmitter FIR filter may comprise a combination of some fixed delays, preset taps, and sparse floating taps for reflection compensation. The disclosed mechanisms may be applied to determine a location and weight of the floating taps in a sparse transmitter FIR filter to provide a desired impulse response.

The disclosed mechanisms may operate substantially faster than a brute force sweep of candidate tap locations and weights, thereby speeding up calibration and use of communication links relying on a sparse, programable delay, transmitter FIR filter to compensate reflections on the channel. The mechanisms may be extended to address the limitations of conventional approaches that configure one tap at a time, thereby neglecting potential benefits of co-optimizing consecutive tap placements and coefficients.

Typical reflections, such as capacitive ones, exhibit a resonant nature spreading across multiple symbol periods, and equalizing such reflections may require the use of multiple filter taps. The co-configuration of consecutive taps may enable further reduction of ISI in the communication channel over approaches that determine the configuration of a single tap at a time.

FIG. 4 depicts an iterative configuration process for a transmitter filter in one embodiment. At a given iteration, an inverse of the transmitter filter impulse response is determined (block 402). A pulse response (e.g., to a 1 unit interval square pulse) is determined at an output of the receiver equalizer (block 404) and this pulse response is adjusted by an effect of the inverse transmitter filter (block 406), which essentially removes the impulse response effects of the transmitter filter as currently configured.

Based on this adjusted pulse response, the transmitter filter is modified (block 408) with one or more floating taps using mechanisms described below. Applying the modified transmitter filter, an updated pulse response is measured at the output of the receiver equalizer (block 410), and if further refinement of the pulse response is called for, and a configured tap limit for the transmitter filter has not been reached, the process is repeated with further iterations.

An initial configuration of the transmitter FIR filter, prior to calibration, may comprise the main cursor and a few preset cursors (post- and/or pre-) near the main cursor to provide some initial level of compensating pre-distortion to the transmitter pulses.

During calibration, the transmitter generates symbols across the communication link. These symbols pass through the receiver equalizer, which adjusts the symbol shapes to their approximate desired form. These symbols are processed through an inverse of the transmitter FIR, generating a "remainder" pulse response that removes the distortions introduced by the transmitter FIR.

This remainder response is input into the iterative floating tap-placement logic. The floating tap placement logic tests different permutations of floating tap placements and selects the configuration of placements that results in the least distortion. Once the floating taps are set for an iteration, if there are more floating taps to place, the process is repeated.

Given a specific FIR filter, the inverse FIR filter may be determined as the set of tap placements and coefficients that, through a convolution with the original filter, produces a unit impulse (Kronecker delta). The inverse filter may be determined from a least squares relationship:

$$\|Ax - b\|^2$$

where A is the convolution matrix of the original filter, b is the target response to the unit impulse, and x is the inverse filter coefficients.

Figure 5:
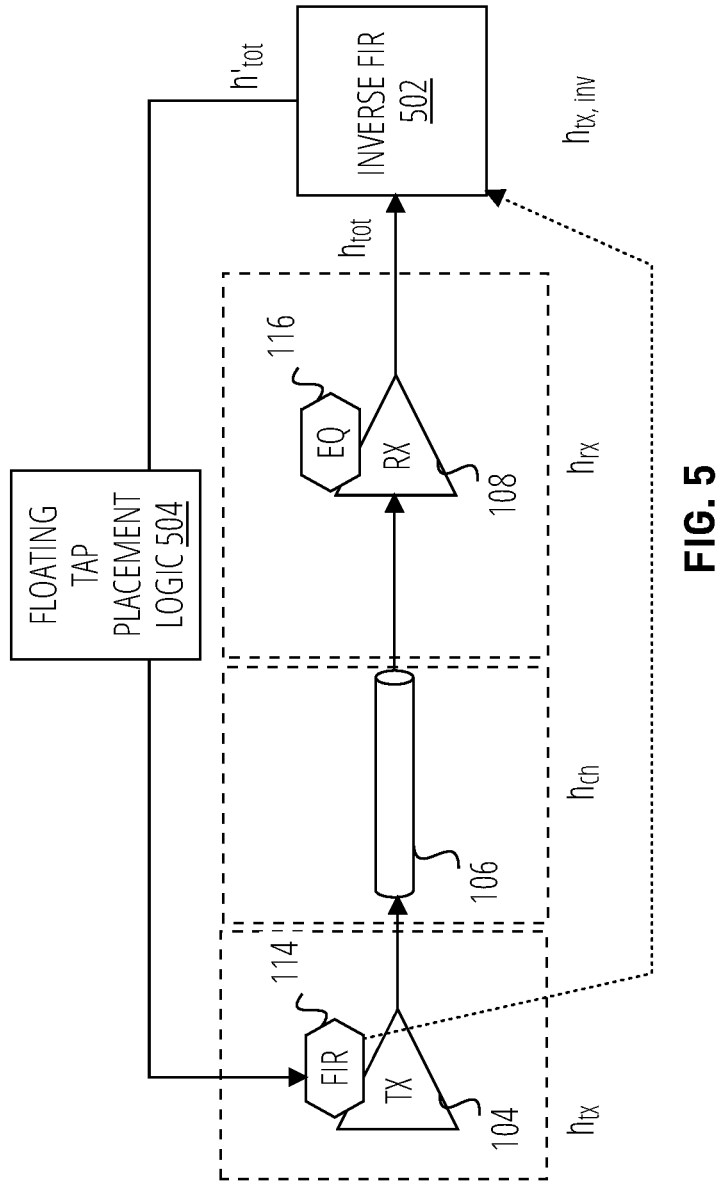
FIG. 5 depicts signal processing utilized in a filter configuration process in one embodiment.

FIG. 5 depicts signal processing utilized in a filter configuration process in one embodiment. The transmitter 104 and initial configuration of the FIR filter 114 are characterized by an impulse response $h_{tx}$. The communication link 106 is characterized by an impulse response $h_{ch}$, and the receiver 108 and equalizer 116 by an impulse response $h_{rx}$. The combined effect of these individual impulse responses is $h_{tot}$. An inverse FIR filter 502 corresponding to the FIR filter 114 of the transmitter 104 is determined and the total system impulse response $h_{tot}$ is modified to $h'_{tot}$ by the impulse response of the inverse FIR filter 502. In other words, a modified impulse response is determined that includes effects of the transmitter 104, communication link 106, receiver 108, and equalizer 116, but not the FIR filter 114. This modified impulse response is applied by the floating tap placement logic 504 to add or modify floating taps in the FIR filter 114, resulting in an updated impulse response $h_{tx}$ for the next iteration.

At a given iteration of the process of adding floating taps to the FIR filter 114, the inverse FIR filter 502 is determined: $h_{tx,inv} := \text{inverse}(h_{tx})$ The total pulse response $h_{tot}$ at the output of the equalizer 116 of the receiver 108 is measured and convolved with the inverse FIR filter 502 to remove the effects of the (linear) FIR filter 114 filter: $h'_{tot} := h_{tot} * h_{tx,inv}$ Floating taps are assigned by the floating tap placement logic 504 to generate an updated configuration of the FIR filter 114, which generates an updated $h_{tx}$, and the process continues until the number of desired floating taps to configure is complete.

Given the pulse response $h'_{tot}$, the FIR filter x may be configured to cancel signal ISI distortions utilizing a least-squares optimization. When the FIR filter comprises a limited number of taps for which the delays are to be selected, the least-squares optimization may be formulated so that only weights/coefficients for select ones of the delays are free parameters and others are presets.

For example, for a FIR filter with the main cursor at delay 0, a least-squares algorithm may be formulated to optimize the taps starting from a post-cursor location K and ending at location K+(L−1), where L defines how many consecutive taps from location K are enabled to potentially comprise a weight.

The least-squares algorithm may be constrained to fix a specific set of tap weights and locations (presets) in the optimization through an equality constraint. This is useful in situations where the main magnitude and phase adjustments of the transmitter FIR filter are pre-selected to generate, as a baseline, an implementation-specific pre-distortion.

Executing the least-squares optimization in an iterative fashion with a sweep of the starting position K and number of consecutive taps N, each candidate tap placement configuration may be graded according to a Mean Squared Error (MSE) criteria of the residual ISI observed in the resulting pulse response achieved when convolving the pulse response h'tot with a current iteration of FIR filter configuration (x).

Grading of the tap delay configurations may be determined by an amount of ISI that is canceled by each one. Each possible combination of assigning delays for P taps in different configurations may be tested.

For a given P-group, the tap placement logic maintains the grouping distribution and tests different ways that distribution fits into the remaining available candidate locations for taps. The fit that measures the lowest MSE is selected as the representative for that P-grouping. A representative distribution is determined for each P-group distribution, and the first N-tap group from the lowest MSE P-group representative is selected for placement in the current iteration.

For example, consider an application in which there are M=9 consecutive locations that may potentially comprise contributing taps beginning at post-cursor location K=16, but from these 9 only 6 tap locations may be utilized (L=6) due to hardware/computing constraints. The initial filter configuration comprises a single main cursor at location 0 with a coefficient of 1. Searching for locations for the remaining taps among all possible configurations of 6 taps in the span of 9 possible locations may be computationally impractical. Therefore a group size of 4 (P=4) is configured. The tap allocation algorithm may proceed as follows:

1. In the first iteration the lowest MSE P-group may be determined to be the distribution N=3 (K=16, 17, 18), N=1 (K=21). A group of 3 consecutive taps are placed at K=16, 17, 18.
2. In the second iteration only 3 taps of the original 6 remain to be allocated. P is reduced from 4 to 3. In this iteration the lowest MSE P-group is determined to be the distribution N=1 (K=21), N=2 (K=23, 24). All three remaining taps are placed at K=21, 23, 24.
3. All taps have been allocated and the algorithm concludes.

Figure 6:
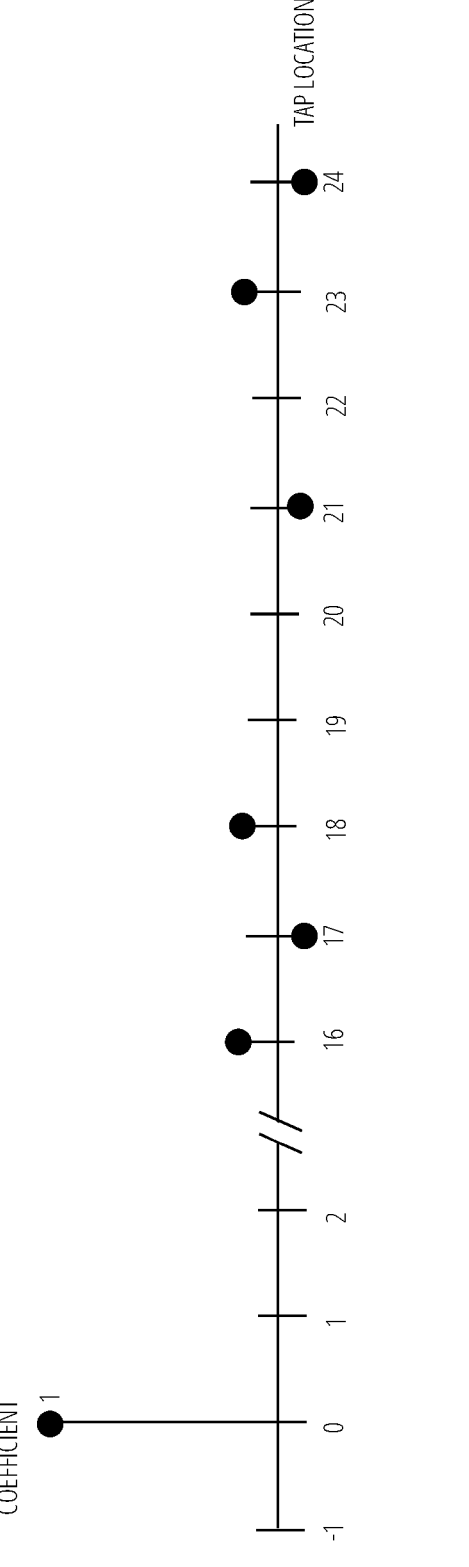
FIG. 6 illustrates an aspect of the subject matter in accordance with one embodiment.

This example results in the sparse allocation depicted in FIG. 6.

Figure 7:
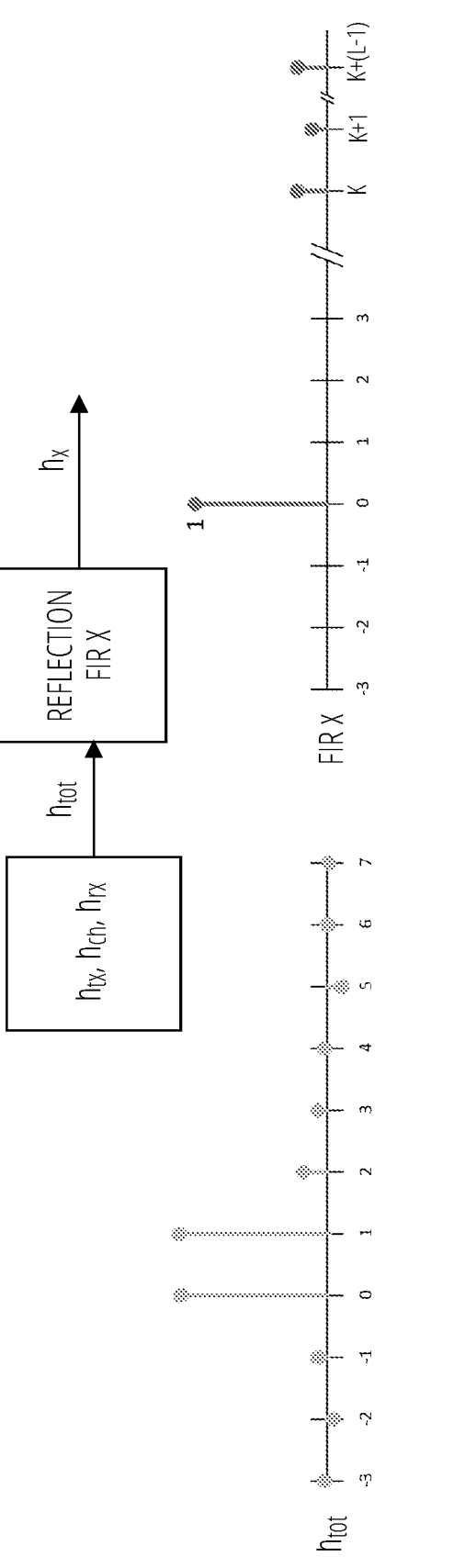
FIG. 7 and FIG. 8 depict a process of floating tap placement in one embodiment.
Figure 8:
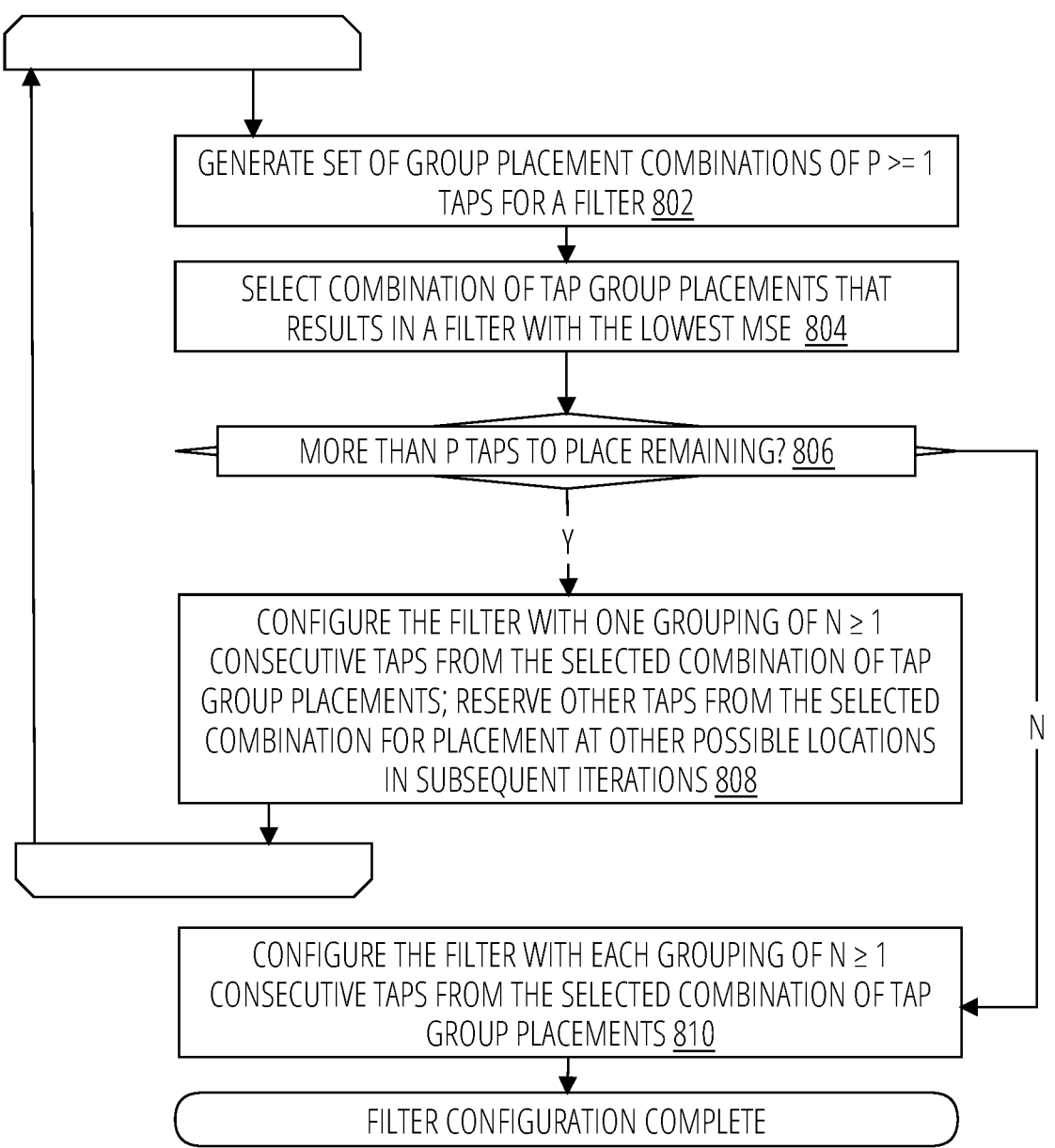

FIG. 7 and FIG. 8 depict a process of floating tap placement in one embodiment. An initial configuration of a FIR filter x may comprise a main-cursor tap with a coefficient of magnitude 1 and possibly some pre- and post-cursor taps to provide some initial pre-distortion to communicated symbols. A total pulse response $h_{tot}$ at an output of the receiver equalizer is determined by the FIR filter impulse response $h_{tx}$, the channel impulse response $h_{ch}$, and the impulse response of the receiver $h_{rx}$. At each iteration, the floating tap placement logic determines and adds a number N>=1 of floating taps from a group distribution that minimizes, to the greatest extent among a number of candidate distributions evaluated, the ISI in the resulting pulse response $h_x$ achieved when convolving $h_{tot}$ with filter FIR x. These additional floating taps are added to the filter configuration as N post-cursors.

One approach for placing floating taps is to sweep potential tap placement locations starting at the position after the first pre-configured post-cursor (or after the main cursor, if there are no pre-configured post-cursors) and place a single tap in each iteration of the filter configuration.

The coefficient for the newly-added floating tap(s) may be determined from a constrained least squares formulation:

$$\text{Minimize } \|Ax - b\|^2 \text{ subject to } Cx = d$$

where matrix A comprises the estimated values for the pulse response $h_{tot}$ at the output of the receiver equalizer. Matrix C is an identity matrix that embodies previously configured locations of taps in the filter, and d comprises the coefficients of the previously configured taps. Parameter b is the desired impulse response. Matrices C and d together form an equality constraint that constrains any previously set taps to their locations and (approximate) coefficients. The solution for the updated filter coefficients, including the newly added floating tap(s), is given by:

$$x = \begin{bmatrix} 2A^T A & C^T \\ C & 0 \end{bmatrix}^{-1} \begin{bmatrix} 2A^T b \\ d \end{bmatrix}$$

In this formulation, matrices A, b, C, and d may be constructed as follows (the example below for C and d assumes a preconfigured filter as depicted in FIG. 7, with a single preconfigured tap of magnitude 1 at the main cursor):

$$A =$$

$$\begin{bmatrix} h(n) & h(n-K) & h(n-(K+1)) & \ldots & h(n-(K+(N-1))) \\ h(n+1) & h(n+1-K) & h(n+1-(K+1))) & \ldots & h(n+1-(K+(N-1))) \\ \vdots & \vdots & \vdots & & \vdots \\ h(M) & h(M-K) & h(M-(K+1)) & \ldots & h(M-(K+(N-1))) \end{bmatrix}$$

$$b = \begin{bmatrix} 0 \\ \vdots \\ h(0) \\ h(1) \\ \vdots \\ 0 \end{bmatrix}$$

$$C = \begin{bmatrix} 1 & 0 & 0 & \ldots & 0 \\ 0 & 0 & 0 & \ldots & 0 \\ \vdots & \vdots & \vdots & & \vdots \\ 0 & 0 & 0 & \ldots & 0 \end{bmatrix}$$

$$d = \begin{bmatrix} 1 \\ 0 \\ \vdots \\ 0 \end{bmatrix}$$

The computed matrix x comprises magnitudes (coefficients) of any preset (existing) taps in the filter, and magnitudes for any newly placed taps at unit interval locations K, K+1 etc.

Instead placing and setting a single floating tap (N=1) at each iteration, it may in some cases be more beneficial to place and set groups of consecutive floating taps per iteration (N=2, 3, etc.). This approach may converge more quickly on a final filter configuration, and/or may achieve a filter configuration that better equalizes ISI.

A brute force approach that tests all possible options for allocating a total of L taps with one extreme being setting L groups of a single tap (N=1) at a time, and the other extreme being setting a group of all L taps at once (N=L), may be computationally impractical for practical values of L in many/most applications.

In one embodiment the floating tap placement logic evaluates combinations of distributing sub-groupings of P taps in each iteration, where P≤L. The floating tap placement logic selects the grouping distribution of P tap placements that configures the filter (as configured by the previous iteration) with the lowest MSE (greatest reduction in ISI distortion), and allocates and sets a single grouping of N≥1 consecutive taps (e.g., the first grouping) from the selected grouping distribution. Other taps from the selected distribution are reserved for placement at other possible locations in subsequent iterations.

By way of example, if P is set to 3, then at each iteration the floating tap placement logic evaluates the combined effect on MSE of placing taps in the following grouping patterns:

N=1, N=1, N=1 (place 3 taps one at a time each at any available remaining tap location; calculate MSE for each distribution);

N=2, N=1 (place a pair of taps at any pair of consecutive remaining tap locations; update filter coefficients; place a single tap any any remaining tap location after placing the pair; update filter coefficients; calculate MSE for each distribution);

N=1, N=2 (place a single tap at any remaining available tap location; update filter coefficients; place a pair of taps at any pair of consecutive remaining tap locations after placing the single tap; update filter coefficients; calculate MSE for each distribution);

N=3 (place three taps at any three consecutive remaining tap locations; update filter coefficients and calculate MSE for each distribution).

The following example demonstrates convergence of the floating tap placement logic in placement and weighting of L=4 floating taps with a configured P value of 3:

Iteration 1:

Option 1) Adding a single tap consecutively 3 times in a row: MSE=−2.0

Option 2) Adding a single tap followed by two consecutive taps: MSE=−1.8

Option 3) Adding two consecutive taps followed by a single tap: MSE=−1.7

Option 4) Adding three consecutive taps: MSE=−1.6

Option 1 yields lowest MSE. The floating tap placement logic adds N=1 tap (of 4 total) to the FIR filter for evaluation in the next iteration.

Iteration 2:

Option 1) Adding a single tap consecutively 3 times in a row: MSE=−2.3

Option 2) Adding a single tap followed by two consecutive taps: MSE=−2.2

Option 3) Adding two consecutive taps followed by a single tap: MSE=−2.1

Option 4) Adding three consecutive taps: MSE=−2.1

Option 1 yields lowest MSE. Because the number of remaining taps (3) is less than or equal to P, all remaining taps are allocated in Iteration 2 in the sequence of Option 1. All L=4 floating taps are thus allocated after two iterations. Although the coefficients of already-allocated taps may change somewhat across iterations, the tap locations may not change once configured.

Referring to FIG. 8, in a process to configure/calibrate a transmitter ISI filter, a set of group placement combinations is generated for P≥1 additional taps to configure in the filter (block 802). A combination of tap group placements that results in a lowest MSE from the desired filter response is selected from the set (block 804). If there remain more than P taps to place (decision block 806), the filter is configured with one grouping of N≥1 consecutive taps from the selected combination of tap group placements (block 808); other taps from the selected combination are reserved for placement at other possible locations in subsequent iterations, which repeat. If however there remain less than or equal to P taps to place, the filter is configured with each grouping of N≥1 consecutive taps (the groupings themselves are not necessarily placed consecutively with one another) from the selected combination of tap group placements (block 810), which completes the filter configuration.

Figure 9:
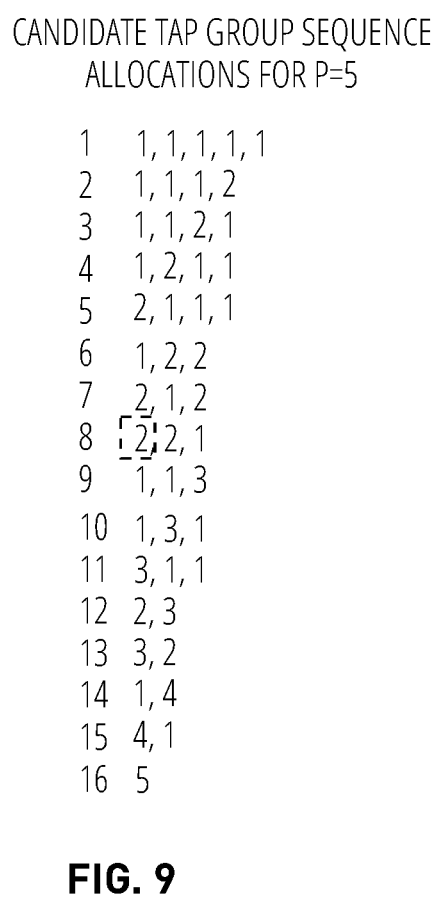

FIG. 9 depicts possible combinations for sequentially placing P=5 floating taps in groupings. In the depicted example, of the 16 possible combinations, the lowest MSE is obtained by Option 8, which involves setting N=2 consecutive taps, updating the filter coefficients, then setting another N=2 consecutive taps, updating the filter coefficients again, and finally setting one (N=1) tap, and making a final update of the filter coefficients. However, in the current iteration that evaluates these 16 options, only one of the groupings from Option 8 (e.g., the first pair of N=2 taps) is actually placed into the updated filter configuration before moving on to the next iteration.

The link configuration/calibration mechanisms disclosed herein may be implemented in computing devices utilizing one or more graphic processing unit (GPU) and/or general purpose data processor (e.g., a 'central processing unit or CPU). Exemplary architectures will now be described that may be configured with the mechanisms disclosed herein on such devices.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 10:
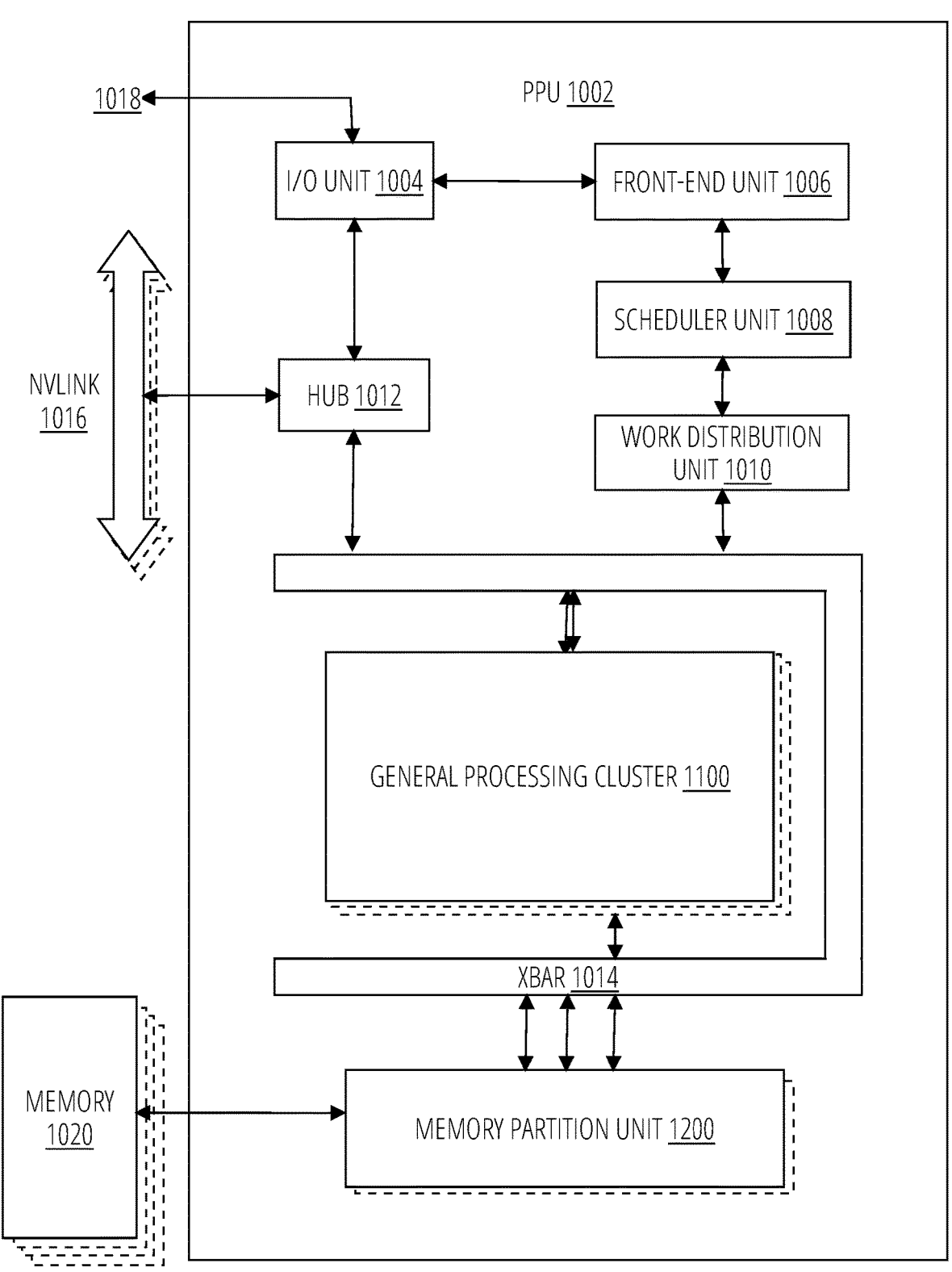
FIG. 10 depicts a parallel processing unit 1002 in accordance with one embodiment.

FIG. 10 depicts a parallel processing unit 1002, in accordance with an embodiment. In an embodiment, the parallel processing unit 1002 is a multi-threaded processor that is implemented on one or more integrated circuit devices. The parallel processing unit 1002 is a latency hiding architecture designed to process many threads in parallel. A thread (e.g., a thread of execution) is an instantiation of a set of instructions configured to be executed by the parallel processing unit 1002. In an embodiment, the parallel processing unit 1002 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1002 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1002 modules may be configured to accelerate thousands of High Performance Computing (HPC), data center, and machine learning applications. The parallel processing unit 1002 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 10, the parallel processing unit 1002 includes an I/O unit 1004, a front-end unit 1006, a scheduler unit 1008, a work distribution unit 1010, a hub 1012, a crossbar 1014, one or more general processing cluster 1100 modules, and one or more memory partition unit 1200 modules. The parallel processing unit 1002 may be connected to a host processor or other parallel processing unit 1002 modules via one or more high-speed NVLink 1016 interconnects. In various embodiments the crossbar 1014 and/or NVLink 1016 may utilize the disclosed configuration/calibration mechanisms.

The parallel processing unit 1002 may be connected to a host processor or other peripheral devices via an interconnect 1018. The parallel processing unit 1002 may also be connected to a local memory comprising a number of memory 1020 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1020 may comprise logic to configure the parallel processing unit 1002 to carry out aspects of the techniques disclosed herein. The bus or busses utilized in the memory subsystem may utilize the disclosed configuration/calibration mechanisms.

The NVLink 1016 interconnect enables systems to scale and include one or more parallel processing unit 1002 modules combined with one or more CPUs, supports cache coherence between the parallel processing unit 1002 modules and CPUs, and CPU mastering. Data and/or commands may be transmitted by the NVLink 1016 through the hub 1012 to/from other units of the parallel processing unit 1002 such as one or more copy engines, a video encoder, a video decoder, a power management unit, etc. (not explicitly shown). The NVLink 1016 is described in more detail in conjunction with FIG. 14.

The I/O unit 1004 is configured to transmit and receive communications (e.g., commands, data, etc.) from a host processor (not shown) over the interconnect 1018. In various embodiments the interconnect 1018 may utilize the disclosed configuration/calibration mechanisms. The I/O unit 1004 may communicate with the host processor directly via the interconnect 1018 or through one or more intermediate devices such as a memory bridge. In an embodiment, the I/O unit 1004 may communicate with one or more other processors, such as one or more parallel processing unit 1002 modules via the interconnect 1018. In an embodiment, the I/O unit 1004 implements a Peripheral Component Interconnect Express (PCIe) interface for communications over a PCIe bus and the interconnect 1018 is a PCIe bus. In alternative embodiments, the I/O unit 1004 may implement other types of well-known interfaces for communicating with external devices.

The I/O unit 1004 decodes packets received via the interconnect 1018. In an embodiment, the packets represent commands configured to cause the parallel processing unit 1002 to perform various operations. The I/O unit 1004 transmits the decoded commands to various other units of the parallel processing unit 1002 as the commands may specify. For example, some commands may be transmitted to the front-end unit 1006. Other commands may be transmitted to the hub 1012 or other units of the parallel processing unit 1002 such as one or more copy engines, a video encoder, a video decoder, a power management unit, etc. (not explicitly shown). In other words, the I/O unit 1004 is configured to route communications between and among the various logical units of the parallel processing unit 1002.

In an embodiment, a program executed by the host processor encodes a command stream in a buffer that provides workloads to the parallel processing unit 1002 for processing. A workload may comprise several instructions and data to be processed by those instructions. The buffer is a region in a memory that is accessible (e.g., read/write) by both the host processor and the parallel processing unit 1002. For example, the I/O unit 1004 may be configured to access the buffer in a system memory connected to the interconnect 1018 via memory requests transmitted over the interconnect 1018. In an embodiment, the host processor writes the command stream to the buffer and then transmits a pointer to the start of the command stream to the parallel processing unit 1002. The front-end unit 1006 receives pointers to one or more command streams. The front-end unit 1006 manages the one or more streams, reading commands from the streams and forwarding commands to the various units of the parallel processing unit 1002.

The front-end unit 1006 is coupled to a scheduler unit 1008 that configures the various general processing cluster 1100 modules to process tasks defined by the one or more streams. The scheduler unit 1008 is configured to track state information related to the various tasks managed by the scheduler unit 1008. The state may indicate which general processing cluster 1100 a task is assigned to, whether the task is active or inactive, a priority level associated with the task, and so forth. The scheduler unit 1008 manages the execution of a plurality of tasks on the one or more general processing cluster 1100 modules.

The scheduler unit 1008 is coupled to a work distribution unit 1010 that is configured to dispatch tasks for execution on the general processing cluster 1100 modules. The work distribution unit 1010 may track a number of scheduled tasks received from the scheduler unit 1008. In an embodiment, the work distribution unit 1010 manages a pending task pool and an active task pool for each of the general processing cluster 1100 modules. The pending task pool may comprise a number of slots (e.g., 32 slots) that contain tasks assigned to be processed by a particular general processing cluster 1100. The active task pool may comprise a number of slots (e.g., 4 slots) for tasks that are actively being processed by the general processing cluster 1100 modules. As a general processing cluster 1100 finishes the execution of a task, that task is evicted from the active task pool for the general processing cluster 1100 and one of the other tasks from the pending task pool is selected and scheduled for execution on the general processing cluster 1100. If an active task has been idle on the general processing cluster 1100, such as while waiting for a data dependency to be resolved, then the active task may be evicted from the general processing cluster 1100 and returned to the pending task pool while another task in the pending task pool is selected and scheduled for execution on the general processing cluster 1100.

The work distribution unit 1010 communicates with the one or more general processing cluster 1100 modules via crossbar 1014. The crossbar 1014 is an interconnect network that couples many of the units of the parallel processing unit 1002 to other units of the parallel processing unit 1002. For example, the crossbar 1014 may be configured to couple the work distribution unit 1010 to a particular general processing cluster 1100. Although not shown explicitly, one or more other units of the parallel processing unit 1002 may also be connected to the crossbar 1014 via the hub 1012.

The tasks are managed by the scheduler unit 1008 and dispatched to a general processing cluster 1100 by the work distribution unit 1010. The general processing cluster 1100 is configured to process the task and generate results. The results may be consumed by other tasks within the general processing cluster 1100, routed to a different general processing cluster 1100 via the crossbar 1014, or stored in the memory 1020. The results can be written to the memory 1020 via the memory partition unit 1200 modules, which implement a memory interface for reading and writing data to/from the memory 1020. The results can be transmitted to another parallel processing unit 1002 or CPU via the NVLink 1016. In an embodiment, the parallel processing unit 1002 includes a number U of memory partition unit 1200 modules that is equal to the number of separate and distinct memory 1020 devices coupled to the parallel processing unit 1002. A memory partition unit 1200 will be described in more detail below in conjunction with FIG. 12.

In an embodiment, a host processor executes a driver kernel that implements an application programming interface (API) that enables one or more applications executing on the host processor to schedule operations for execution on the parallel processing unit 1002. In an embodiment, multiple compute applications are simultaneously executed by the parallel processing unit 1002 and the parallel processing unit 1002 provides isolation, quality of service (QoS), and independent address spaces for the multiple compute applications. An application may generate instructions (e.g., API calls) that cause the driver kernel to generate one or more tasks for execution by the parallel processing unit 1002. The driver kernel outputs tasks to one or more streams being processed by the parallel processing unit 1002. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 13.

Figure 11:
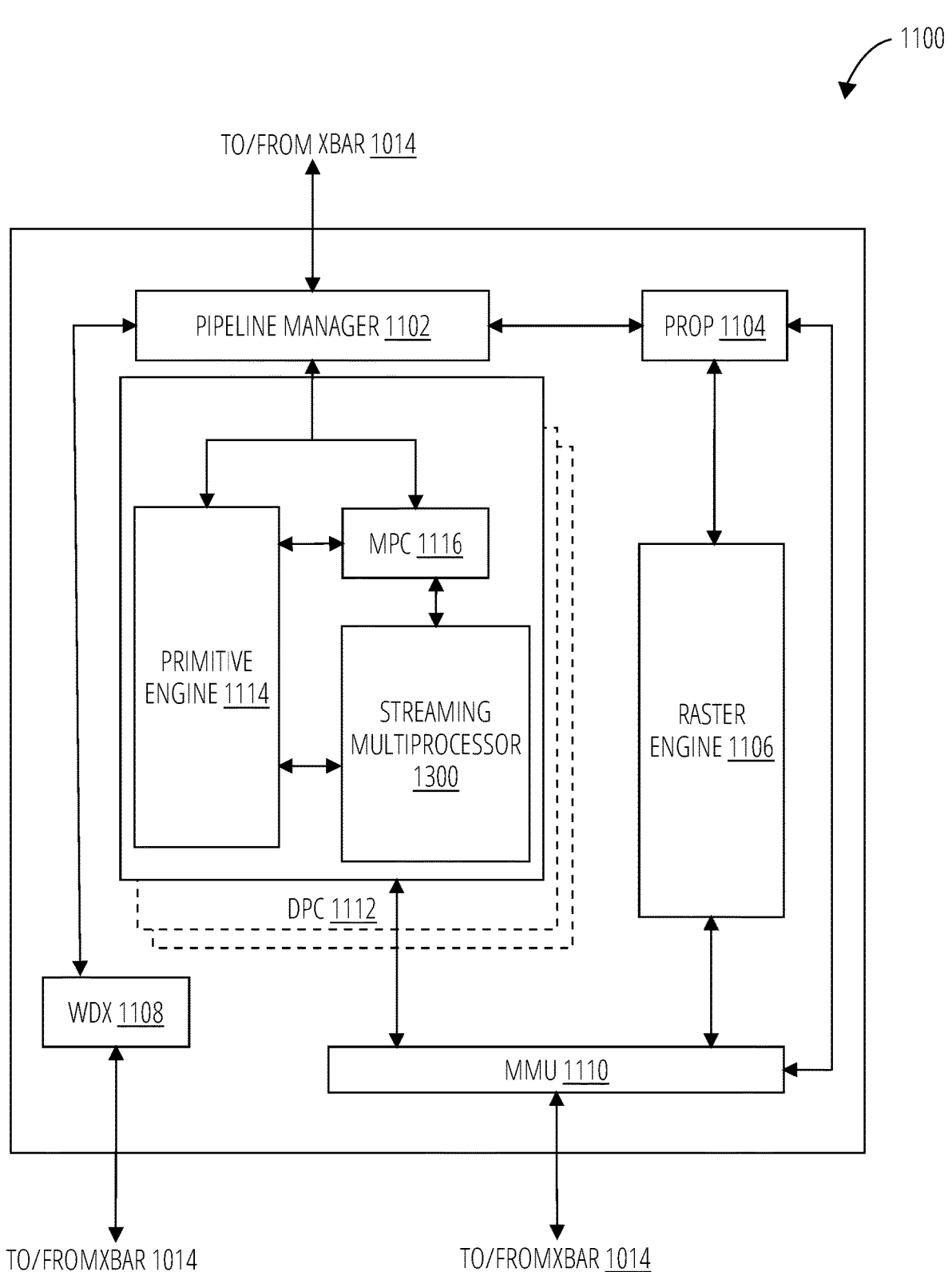
FIG. 11 depicts a general processing cluster 1100 in accordance with one embodiment.

FIG. 11 depicts a general processing cluster 1100 of the parallel processing unit 1002 of FIG. 10, in accordance with an embodiment. As shown in FIG. 11, each general processing cluster 1100 includes a number of hardware units for processing tasks. In an embodiment, each general processing cluster 1100 includes a pipeline manager 1102, a pre-raster operations unit 1104, a raster engine 1106, a work distribution crossbar 1108, a memory management unit 1110, and one or more data processing cluster 1112. It will be appreciated that the general processing cluster 1100 of FIG. 11 may include other hardware units in lieu of or in addition to the units shown in FIG. 11.

In an embodiment, the operation of the general processing cluster 1100 is controlled by the pipeline manager 1102. The pipeline manager 1102 manages the configuration of the one or more data processing cluster 1112 modules for processing tasks allocated to the general processing cluster 1100. In an embodiment, the pipeline manager 1102 may configure at least one of the one or more data processing cluster 1112 modules to implement at least a portion of a graphics rendering pipeline. For example, a data processing cluster 1112 may be configured to execute a vertex shader program on the programmable streaming multiprocessor 1300. The pipeline manager 1102 may also be configured to route packets received from the work distribution unit 1010 to the appropriate logical units within the general processing cluster 1100. For example, some packets may be routed to fixed function hardware units in the pre-raster operations unit 1104 and/or raster engine 1106 while other packets may be routed to the data processing cluster 1112 modules for processing by the primitive engine 1114 or the streaming multiprocessor 1300. In an embodiment, the pipeline manager 1102 may configure at least one of the one or more data processing cluster 1112 modules to implement a neural network model and/or a computing pipeline.

Figure 12:
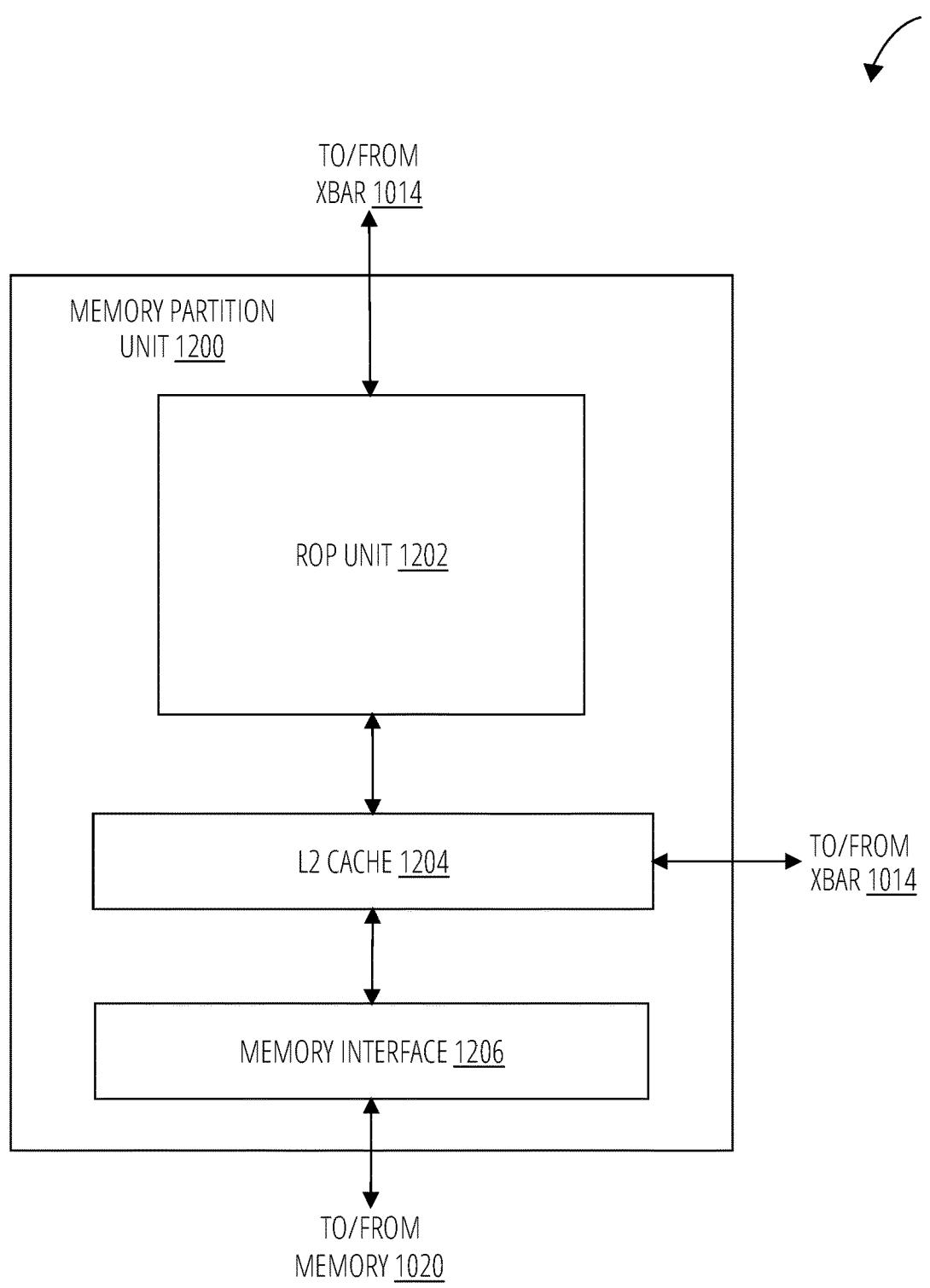
FIG. 12 depicts a memory partition unit 1200 in accordance with one embodiment.

The pre-raster operations unit 1104 is configured to route data generated by the raster engine 1106 and the data processing cluster 1112 modules to a Raster Operations (ROP) unit, described in more detail in conjunction with FIG. 12. The pre-raster operations unit 1104 may also be configured to perform optimizations for color blending, organize pixel data, perform address translations, and the like.

The raster engine 1106 includes a number of fixed function hardware units configured to perform various raster operations. In an embodiment, the raster engine 1106 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1106 comprises fragments to be processed, for example, by a fragment shader implemented within a data processing cluster 1112.

Each data processing cluster 1112 included in the general processing cluster 1100 includes an M-pipe controller 1116, a primitive engine 1114, and one or more streaming multi-processor 1300 modules. The M-pipe controller 1116 controls the operation of the data processing cluster 1112, routing packets received from the pipeline manager 1102 to the appropriate units in the data processing cluster 1112. For example, packets associated with a vertex may be routed to the primitive engine 1114, which is configured to fetch vertex attributes associated with the vertex from the memory 1020. In contrast, packets associated with a shader program may be transmitted to the streaming multiprocessor 1300.

The streaming multiprocessor 1300 comprises a programmable streaming processor that is configured to process tasks represented by a number of threads. Each streaming multiprocessor 1300 is multi-threaded and configured to execute a plurality of threads (e.g., 32 threads) from a particular group of threads concurrently. In an embodiment, the streaming multiprocessor 1300 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1300 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1300 will be described in more detail below in conjunction with FIG. 13.

The memory management unit 1110 provides an interface between the general processing cluster 1100 and the memory partition unit 1200. The memory management unit 1110 may provide translation of virtual addresses into physical addresses, memory protection, and arbitration of memory requests. In an embodiment, the memory management unit 1110 provides one or more translation lookaside buffers (TLBs) for performing translation of virtual addresses into physical addresses in the memory 1020.

FIG. 12 depicts a memory partition unit 1200 of the parallel processing unit 1002 of FIG. 10, in accordance with an embodiment. As shown in FIG. 12, the memory partition unit 1200 includes a raster operations unit 1202, a level two cache 1204, and a memory interface 1206. The memory interface 1206 is coupled to the memory 1020. Memory interface 1206 may implement 32, 64, 128, 1024-bit data buses, or the like, for high-speed data transfer. In various embodiments these buses may utilize the disclosed configuration/calibration mechanisms. In an embodiment, the parallel processing unit 1002 incorporates U memory interface 1206 modules, one memory interface 1206 per pair of memory partition unit 1200 modules, where each pair of memory partition unit 1200 modules is connected to a corresponding memory 1020 device. For example, parallel processing unit 1002 may be connected to up to Y memory 1020 devices, such as high bandwidth memory stacks or graphics double-data-rate, version 5, synchronous dynamic random access memory, or other types of persistent storage.

In an embodiment, the memory interface 1206 implements an HBM2 memory interface and Y equals half U. In an embodiment, the HBM2 memory stacks are located on the same physical package as the parallel processing unit 1002, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1020 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1002 modules process very large datasets and/or run applications for extended periods.

In an embodiment, the parallel processing unit 1002 implements a multi-level memory hierarchy. In an embodiment, the memory partition unit 1200 supports a unified memory to provide a single unified virtual address space for CPU and parallel processing unit 1002 memory, enabling data sharing between virtual memory systems. In an embodiment the frequency of accesses by a parallel processing unit 1002 to memory located on other processors is traced to ensure that memory pages are moved to the physical memory of the parallel processing unit 1002 that is accessing the pages more frequently. In an embodiment, the NVLink 1016 supports address translation services allowing the parallel processing unit 1002 to directly access a CPU's page tables and providing full access to CPU memory by the parallel processing unit 1002.

In an embodiment, copy engines transfer data between multiple parallel processing unit 1002 modules or between parallel processing unit 1002 modules and CPUs. The copy engines can generate page faults for addresses that are not mapped into the page tables. The memory partition unit 1200 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1020 or other system memory may be fetched by the memory partition unit 1200 and stored in the level two cache 1204, which is located on-chip and is shared between the various general processing cluster 1100 modules. As shown, each memory partition unit 1200 includes a portion of the level two cache 1204 associated with a corresponding memory 1020 device. Lower level caches may then be implemented in various units within the general processing cluster 1100 modules. For example, each of the streaming multiprocessor 1300 modules may implement an L1 cache. The L1 cache is private memory that is dedicated to a particular streaming multiprocessor 1300. Data from the level two cache 1204 may be fetched and stored in each of the L1 caches for processing in the functional units of the streaming multiprocessor 1300 modules. The level two cache 1204 is coupled to the memory interface 1206 and the crossbar 1014. In various embodiments the memory interface 1206 may utilize the disclosed configuration/calibration mechanisms.

The raster operations unit 1202 performs graphics raster operations related to pixel color, such as color compression, pixel blending, and the like. The raster operations unit 1202 also implements depth testing in conjunction with the raster engine 1106, receiving a depth for a sample location associated with a pixel fragment from the culling engine of the raster engine 1106. The depth is tested against a corresponding depth in a depth buffer for a sample location associated with the fragment. If the fragment passes the depth test for the sample location, then the raster operations unit 1202 updates the depth buffer and transmits a result of the depth test to the raster engine 1106. It will be appreciated that the number of partition memory partition unit 1200 modules may be different than the number of general processing cluster 1100 modules and, therefore, each raster operations unit 1202 may be coupled to each of the general processing cluster 1100 modules. The raster operations unit 1202 tracks packets received from the different general processing cluster 1100 modules and determines which general processing cluster 1100 that a result generated by the raster operations unit 1202 is routed to through the crossbar 1014. Although the raster operations unit 1202 is included within the memory partition unit 1200 in FIG. 12, in other embodiment, the raster operations unit 1202 may be outside of the memory partition unit 1200. For example, the raster operations unit 1202 may reside in the general processing cluster 1100 or another unit.

Figure 13:
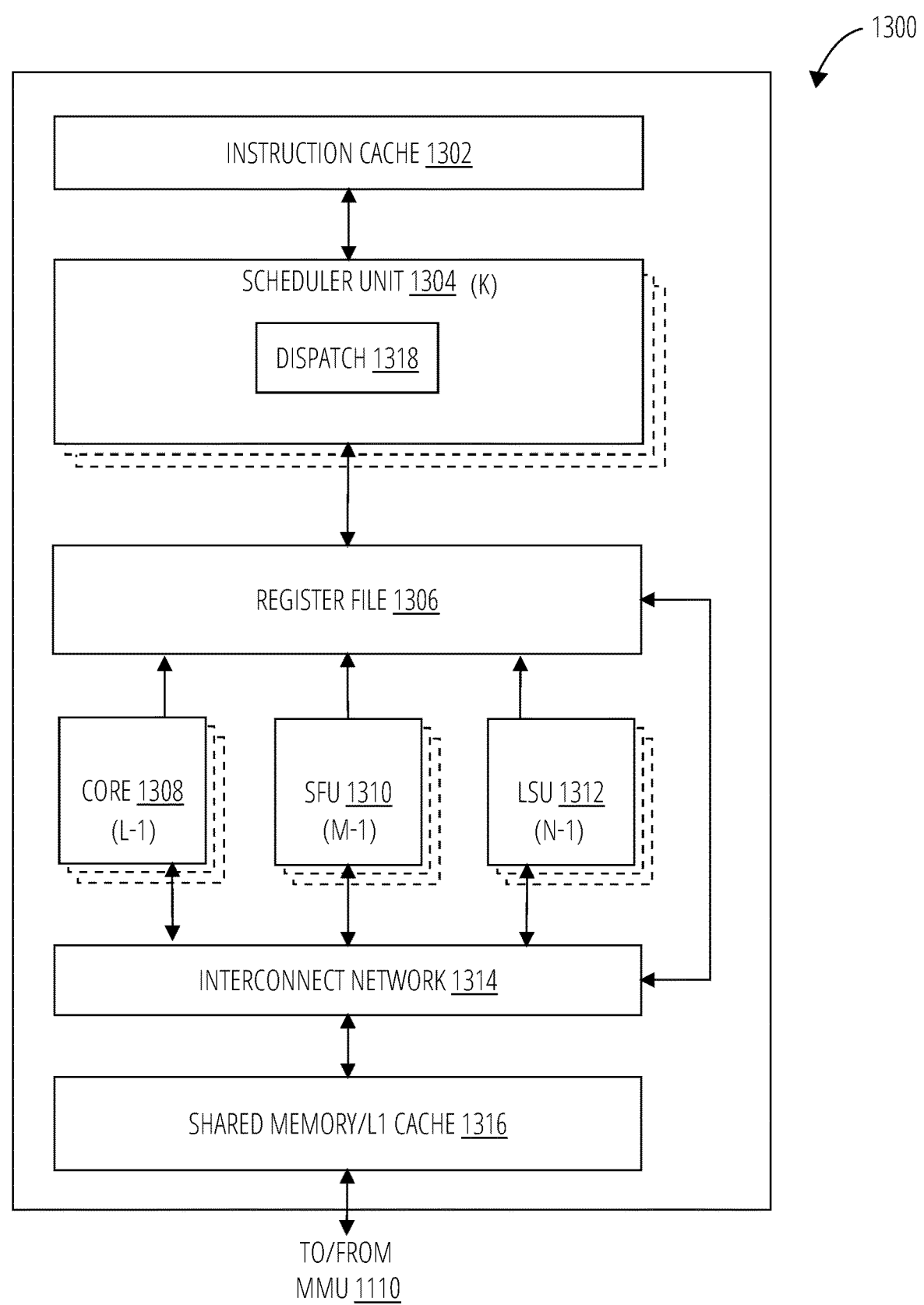
FIG. 13 depicts a streaming multiprocessor 1300 in accordance with one embodiment.

FIG. 13 illustrates the streaming multiprocessor 1300 of FIG. 11, in accordance with an embodiment. As shown in FIG. 13, the streaming multiprocessor 1300 includes an instruction cache 1302, one or more scheduler unit 1304 modules (e.g., such as scheduler unit 1008), a register file 1306, one or more processing core 1308 modules, one or more special function unit 1310 modules, one or more load/store unit 1312 modules, an interconnect network 1314, and a shared memory/L1 cache 1316.

As described above, the work distribution unit 1010 dispatches tasks for execution on the general processing cluster 1100 modules of the parallel processing unit 1002. The tasks are allocated to a particular data processing cluster 1112 within a general processing cluster 1100 and, if the task is associated with a shader program, the task may be allocated to a streaming multiprocessor 1300. The scheduler unit 1008 receives the tasks from the work distribution unit 1010 and manages instruction scheduling for one or more thread blocks assigned to the streaming multiprocessor 1300. The scheduler unit 1304 schedules thread blocks for execution as warps of parallel threads, where each thread block is allocated at least one warp. In an embodiment, each warp executes 32 threads. The scheduler unit 1304 may manage a plurality of different thread blocks, allocating the warps to the different thread blocks and then dispatching instructions from the plurality of different cooperative groups to the various functional units (e.g., core 1308 modules, special function unit 1310 modules, and load/store unit 1312 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1318 unit is configured within the scheduler unit 1304 to transmit instructions to one or more of the functional units. In one embodiment, the scheduler unit 1304 includes two dispatch 1318 units that enable two different instructions from the same warp to be dispatched during each clock cycle. In alternative embodiments, each scheduler unit 1304 may include a single dispatch 1318 unit or additional dispatch 1318 units.

Each streaming multiprocessor 1300 includes a register file 1306 that provides a set of registers for the functional units of the streaming multiprocessor 1300. In an embodiment, the register file 1306 is divided between each of the functional units such that each functional unit is allocated a dedicated portion of the register file 1306. In another embodiment, the register file 1306 is divided between the different warps being executed by the streaming multiprocessor 1300. The register file 1306 provides temporary storage for operands connected to the data paths of the functional units.

Each streaming multiprocessor 1300 comprises L processing core 1308 modules. In an embodiment, the streaming multiprocessor 1300 includes a large number (e.g., 128, etc.) of distinct processing core 1308 modules. Each core 1308 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1308 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1308 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1300 also comprises M special function unit 1310 modules that perform special functions (e.g., attribute evaluation, reciprocal square root, and the like). In an embodiment, the special function unit 1310 modules may include a tree traversal unit configured to traverse a hierarchical tree data structure. In an embodiment, the special function unit 1310 modules may include texture unit configured to perform texture map filtering operations. In an embodiment, the texture units are configured to load texture maps (e.g., a 2D array of texels) from the memory 1020 and sample the texture maps to produce sampled texture values for use in shader programs executed by the streaming multiprocessor 1300. In an embodiment, the texture maps are stored in the shared memory/L1 cache 1316. The texture units implement texture operations such as filtering operations using mip-maps (e.g., texture maps of varying levels of detail). In an embodiment, each streaming multiprocessor 1300 includes two texture units.

Each streaming multiprocessor 1300 also comprises N load/store unit 1312 modules that implement load and store operations between the shared memory/L1 cache 1316 and the register file 1306. Each streaming multiprocessor 1300 includes an interconnect network 1314 that connects each of the functional units to the register file 1306 and the load/store unit 1312 to the register file 1306 and shared memory/L1 cache 1316. In an embodiment, the interconnect network 1314 is a crossbar that can be configured to connect any of the functional units to any of the registers in the register file

1306 and connect the load/store unit 1312 modules to the register file 1306 and memory locations in shared memory/L1 cache 1316.

The shared memory/L1 cache 1316 is an array of on-chip memory that allows for data storage and communication between the streaming multiprocessor 1300 and the primitive engine 1114 and between threads in the streaming multiprocessor 1300. In an embodiment, the shared memory/L1 cache 1316 comprises 128 KB of storage capacity and is in the path from the streaming multiprocessor 1300 to the memory partition unit 1200. The shared memory/L1 cache 1316 can be used to cache reads and writes. One or more of the shared memory/L1 cache 1316, level two cache 1204, and memory 1020 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1316 enables the shared memory/L1 cache 1316 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 10, are bypassed, creating a much simpler programming model. In the general purpose parallel computation configuration, the work distribution unit 1010 assigns and distributes blocks of threads directly to the data processing cluster 1112 modules. The threads in a block execute the same program, using a unique thread ID in the calculation to ensure each thread generates unique results, using the streaming multiprocessor 1300 to execute the program and perform calculations, shared memory/L1 cache 1316 to communicate between threads, and the load/store unit 1312 to read and write global memory through the shared memory/L1 cache 1316 and the memory partition unit 1200. When configured for general purpose parallel computation, the streaming multiprocessor 1300 can also write commands that the scheduler unit 1008 can use to launch new work on the data processing cluster 1112 modules.

The parallel processing unit 1002 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1002 is embodied on a single semiconductor substrate. In another embodiment, the parallel processing unit 1002 is included in a system-on-a-chip (SoC) along with one or more other devices such as additional parallel processing unit 1002 modules, the memory 1020, a reduced instruction set computer (RISC) CPU, a memory management unit (MMU), a digital-to-analog converter (DAC), and the like.

In an embodiment, the parallel processing unit 1002 may be included on a graphics card that includes one or more memory devices. The graphics card may be configured to interface with a PCIe slot on a motherboard of a desktop computer. In yet another embodiment, the parallel processing unit 1002 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 14:
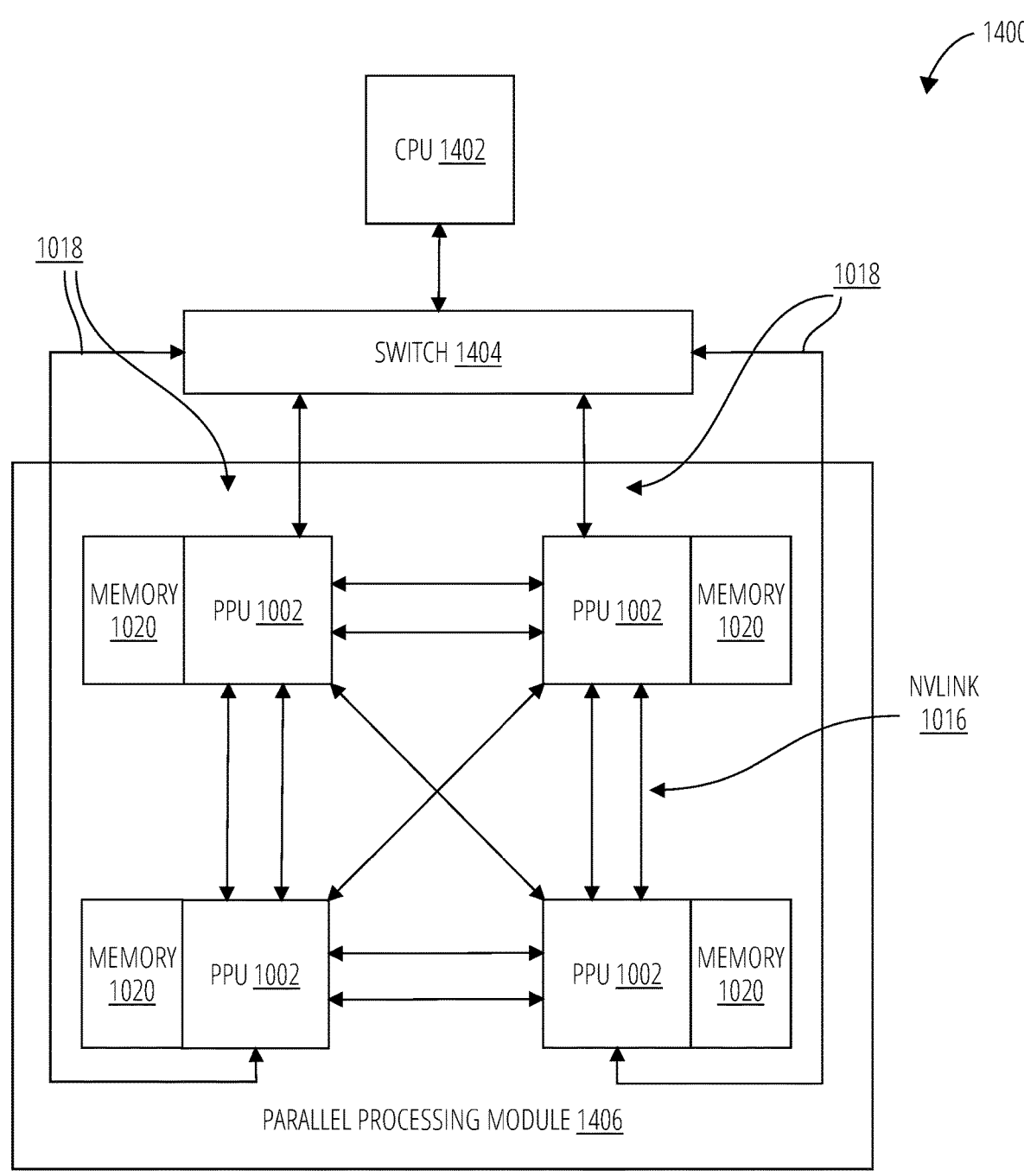
FIG. 14 depicts a processing system 1400 in accordance with one embodiment.

FIG. 14 is a conceptual diagram of a processing system 1400 implemented using the parallel processing unit 1002 of FIG. 10, in accordance with an embodiment. The processing system 1400 includes a central processing unit 1402, switch 1404, and multiple parallel processing unit 1002 modules each and respective memory 1020 modules. The NVLink 1016 provides high-speed communication links between each of the parallel processing unit 1002 modules. Although a particular number of NVLink 1016 and interconnect 1018 connections are illustrated in FIG. 14, the number of connections to each parallel processing unit 1002 and the central processing unit 1402 may vary. The switch 1404 interfaces between the interconnect 1018 and the central processing unit 1402. The parallel processing unit 1002 modules, memory 1020 modules, and NVLink 1016 connections may be situated on a single semiconductor platform to form a parallel processing module 1406. In an embodiment, the switch 1404 supports two or more protocols to interface between various different connections and/or links.

In another embodiment (not shown), the NVLink 1016 provides one or more high-speed communication links between each of the parallel processing unit modules (parallel processing unit 1002, parallel processing unit 1002, parallel processing unit 1002, and parallel processing unit 1002) and the central processing unit 1402 and the switch 1404 interfaces between the interconnect 1018 and each of the parallel processing unit modules. The parallel processing unit modules, memory 1020 modules, and interconnect 1018 may be situated on a single semiconductor platform to form a parallel processing module 1406. In yet another embodiment (not shown), the interconnect 1018 provides one or more communication links between each of the parallel processing unit modules and the central processing unit 1402 and the switch 1404 interfaces between each of the parallel processing unit modules using the NVLink 1016 to provide one or more high-speed communication links between the parallel processing unit modules. In another embodiment (not shown), the NVLink 1016 provides one or more high-speed communication links between the parallel processing unit modules and the central processing unit 1402 through the switch 1404. In yet another embodiment (not shown), the interconnect 1018 provides one or more communication links between each of the parallel processing unit modules directly. One or more of the NVLink 1016 high-speed communication links may be implemented as a physical NVLink interconnect or either an on-chip or on-die interconnect using the same protocol as the NVLink 1016.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1406 may be implemented as a circuit board substrate and each of the parallel processing unit modules and/or memory 1020 modules may be packaged devices. In an embodiment, the central processing unit 1402, switch 1404, and the parallel processing module 1406 are situated on a single semiconductor platform.

In an embodiment, the signaling rate of each NVLink 1016 is 20 to 25 Gigabits/second and each parallel processing unit module includes six NVLink 1016 interfaces (as shown in FIG. 14, five NVLink 1016 interfaces are included for each parallel processing unit module). Each NVLink 1016 provides a data transfer rate of 25 Gigabytes/second in each direction, with six links providing 300 Gigabytes/second. The NVLink 1016 can be used exclusively for PPU-to-PPU communication as shown in FIG. 14, or some combination of PPU-to-PPU and PPU-to-CPU, when the central processing unit 1402 also includes one or more NVLink 1016 interfaces.

In an embodiment, the NVLink 1016 allows direct load/store/atomic access from the central processing unit 1402 to each parallel processing unit module's memory 1020. In an embodiment, the NVLink 1016 supports coherency operations, allowing data read from the memory 1020 modules to be stored in the cache hierarchy of the central processing unit 1402, reducing cache access latency for the central processing unit 1402. In an embodiment, the NVLink 1016 includes support for Address Translation Services (ATS), enabling the parallel processing unit module to directly access page tables within the central processing unit 1402. One or more of the NVLink 1016 may also be configured to operate in a low-power mode.

Figure 15:
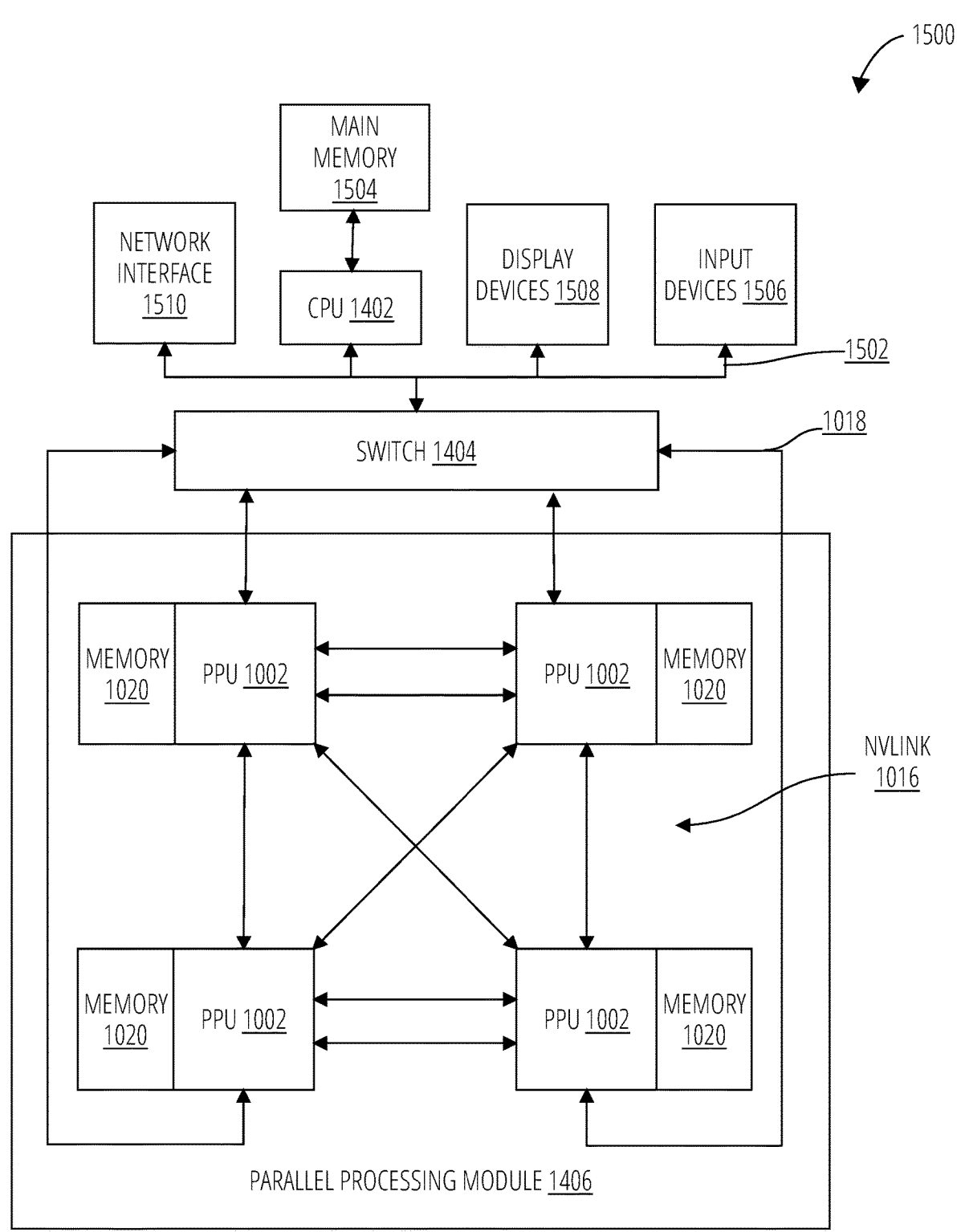
FIG. 15 depicts an exemplary processing system 1500 in accordance with another embodiment.

FIG. 15 depicts an exemplary processing system 1500 in which the various architecture and/or functionality of the various previous embodiments may be implemented. As shown, an exemplary processing system 1500 is provided including at least one central processing unit 1402 that is connected to a communications bus 1502. The communication communications bus 1502 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1500 also includes a main memory 1504. Control logic (software) and data are stored in the main memory 1504 which may take the form of random access memory (RAM).

The exemplary processing system 1500 also includes input devices 1506, the parallel processing module 1406, and display devices 1508, e.g. a conventional CRT (cathode ray tube), LCD (liquid crystal display), LED (light emitting diode), plasma display or the like. User input may be received from the input devices 1506, e.g., keyboard, mouse, touchpad, microphone, and the like. Each of the foregoing modules and/or devices may even be situated on a single semiconductor platform to form the exemplary processing system 1500. Alternately, the various modules may also be situated separately or in various combinations of semiconductor platforms per the desires of the user.

Further, the exemplary processing system 1500 may be coupled to a network (e.g., a telecommunications network, local area network (LAN), wireless network, wide area network (WAN) such as the Internet, peer-to-peer network, cable network, or the like) through a network interface 1510 for communication purposes.

The exemplary processing system 1500 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1504 and/or the secondary storage. Such computer programs, when executed, enable the exemplary processing system 1500 to perform various functions. The main memory 1504, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1500 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 16:
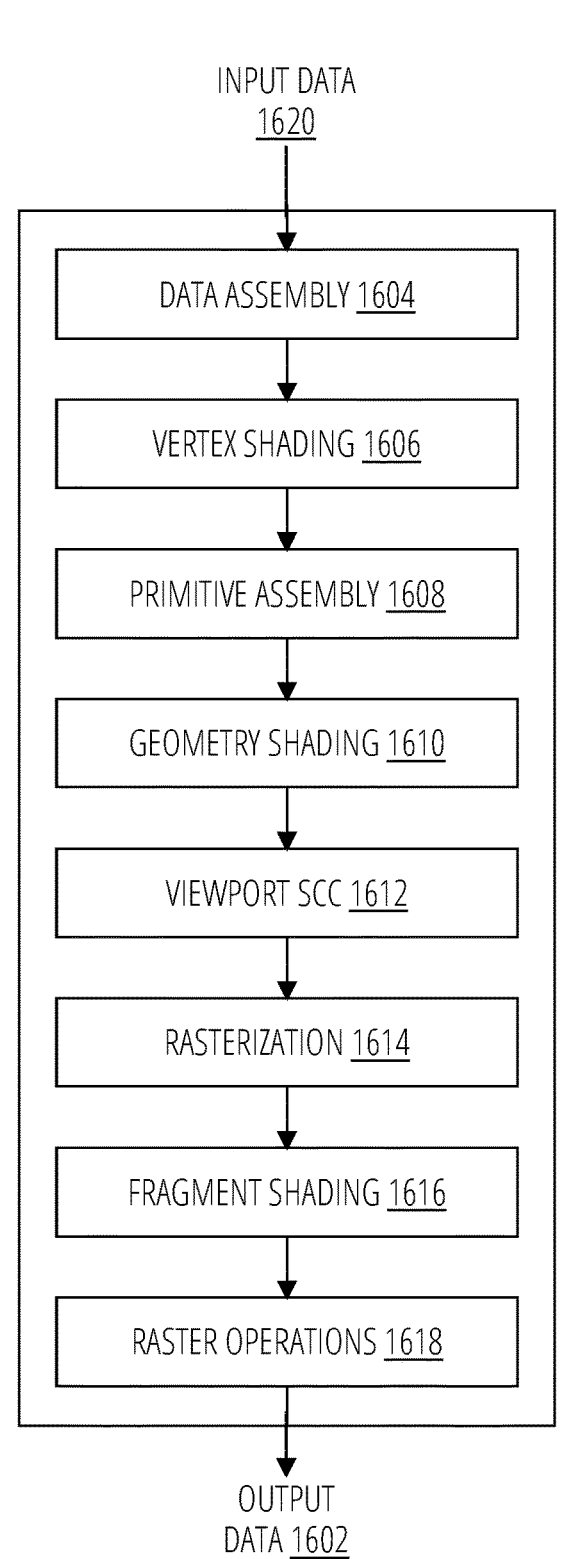
FIG. 16 depicts a graphics processing pipeline 1600 in accordance with one embodiment.

FIG. 16 is a conceptual diagram of a graphics processing pipeline 1600 implemented by the parallel processing unit 1002 of FIG. 10, in accordance with an embodiment. In an embodiment, the parallel processing unit 1002 comprises a graphics processing unit (GPU). The parallel processing unit 1002 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1002 can be configured to process the graphics primitives to generate a frame buffer (e.g., pixel data for each of the pixels of the display).

An application writes model data for a scene (e.g., a collection of vertices and attributes) to a memory such as a system memory or memory 1020. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1300 modules of the parallel processing unit 1002 including one or more of a vertex shader, hull shader, domain shader, geometry shader, and a pixel shader. For example, one or more of the streaming multiprocessor 1300 modules may be configured to execute a vertex shader program that processes a number of vertices defined by the model data. In an embodiment, the different streaming multiprocessor 1300 modules may be configured to execute different shader programs concurrently. For example, a first subset of streaming multiprocessor 1300 modules may be configured to execute a vertex shader program while a second subset of streaming multiprocessor 1300 modules may be configured to execute a pixel shader program. The first subset of streaming multiprocessor 1300 modules processes vertex data to produce processed vertex data and writes the processed vertex data to the level two cache 1204 and/or the memory 1020. After the processed vertex data is rasterized (e.g., transformed from three-dimensional data into two-dimensional data in screen space) to produce fragment data, the second subset of streaming multiprocessor 1300 modules executes a pixel shader to produce processed fragment data, which is then blended with other processed fragment data and written to the frame buffer in memory 1020. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1600 receives input data 601 that is transmitted from one stage to the next stage of the graphics processing pipeline 1600 to generate output data 1602. In an embodiment, the graphics processing pipeline 1600 may represent a graphics processing pipeline defined by the OpenGL® API. As an option, the graphics processing pipeline 1600 may be implemented in the context of the functionality and architecture of the previous Figures and/or any subsequent Figure(s).

As shown in FIG. 16, the graphics processing pipeline 1600 comprises a pipeline architecture that includes a number of stages. The stages include, but are not limited to, a data assembly 1604 stage, a vertex shading 1606 stage, a primitive assembly 1608 stage, a geometry shading 1610 stage, a viewport SCC 1612 stage, a rasterization 1614 stage, a fragment shading 1616 stage, and a raster operations 1618 stage. In an embodiment, the input data 1620 comprises commands that configure the processing units to implement the stages of the graphics processing pipeline 1600 and geometric primitives (e.g., points, lines, triangles, quads, triangle strips or fans, etc.) to be processed by the stages. The output data 1602 may comprise pixel data (e.g., color data) that is copied into a frame buffer or other type of surface data structure in a memory.

The data assembly 1604 stage receives the input data 1620 that specifies vertex data for high-order surfaces, primitives, or the like. The data assembly 1604 stage collects the vertex data in a temporary storage or queue, such as by receiving a command from the host processor that includes a pointer to a buffer in memory and reading the vertex data from the buffer. The vertex data is then transmitted to the vertex shading 1606 stage for processing.

The vertex shading 1606 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1606 stage may manipulate individual vertex attributes such as position, color, texture coordinates, and the like. In other words, the vertex shading 1606 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1606 stage generates transformed vertex data that is transmitted to the primitive assembly 1608 stage.

The primitive assembly 1608 stage collects vertices output by the vertex shading 1606 stage and groups the vertices into geometric primitives for processing by the geometry shading 1610 stage. For example, the primitive assembly 1608 stage may be configured to group every three consecutive vertices as a geometric primitive (e.g., a triangle) for transmission to the geometry shading 1610 stage. In some embodiments, specific vertices may be reused for consecutive geometric primitives (e.g., two consecutive triangles in a triangle strip may share two vertices). The primitive assembly 1608 stage transmits geometric primitives (e.g., a collection of associated vertices) to the geometry shading 1610 stage.

The geometry shading 1610 stage processes geometric primitives by performing a set of operations (e.g., a geometry shader or program) on the geometric primitives. Tessellation operations may generate one or more geometric primitives from each geometric primitive. In other words, the geometry shading 1610 stage may subdivide each geometric primitive into a finer mesh of two or more geometric primitives for processing by the rest of the graphics processing pipeline 1600. The geometry shading 1610 stage transmits geometric primitives to the viewport SCC 1612 stage.

In an embodiment, the graphics processing pipeline 1600 may operate within a streaming multiprocessor and the vertex shading 1606 stage, the primitive assembly 1608 stage, the geometry shading 1610 stage, the fragment shading 1616 stage, and/or hardware/software associated therewith, may sequentially perform processing operations. Once the sequential processing operations are complete, in an embodiment, the viewport SCC 1612 stage may utilize the data. In an embodiment, primitive data processed by one or more of the stages in the graphics processing pipeline 1600 may be written to a cache (e.g. L1 cache, a vertex cache, etc.). In this case, in an embodiment, the viewport SCC 1612 stage may access the data in the cache. In an embodiment, the viewport SCC 1612 stage and the rasterization 1614 stage are implemented as fixed function circuitry.

The viewport SCC 1612 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1614 stage.

The rasterization 1614 stage converts the 3D geometric primitives into 2D fragments (e.g. capable of being utilized for display, etc.). The rasterization 1614 stage may be configured to utilize the vertices of the geometric primitives to setup a set of plane equations from which various attributes can be interpolated. The rasterization 1614 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1614 stage generates fragment data (e.g., interpolated vertex attributes associated with a particular sample location for each covered pixel) that are transmitted to the fragment shading 1616 stage.

The fragment shading 1616 stage processes fragment data by performing a set of operations (e.g., a fragment shader or a program) on each of the fragments. The fragment shading 1616 stage may generate pixel data (e.g., color values) for the fragment such as by performing lighting operations or sampling texture maps using interpolated texture coordinates for the fragment. The fragment shading 1616 stage generates pixel data that is transmitted to the raster operations 1618 stage.

The raster operations 1618 stage may perform various operations on the pixel data such as performing alpha tests, stencil tests, and blending the pixel data with other pixel data corresponding to other fragments associated with the pixel. When the raster operations 1618 stage has finished processing the pixel data (e.g., the output data 1602), the pixel data may be written to a render target such as a frame buffer, a color buffer, or the like.

It will be appreciated that one or more additional stages may be included in the graphics processing pipeline 1600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1610 stage). Other types of graphics processing pipelines are contemplated as being within the scope of the present disclosure. Furthermore, any of the stages of the graphics processing pipeline 1600 may be implemented by one or more dedicated hardware units within a graphics processor such as parallel processing unit 1002. Other stages of the graphics processing pipeline 1600 may be implemented by programmable hardware units such as the streaming multiprocessor 1300 of the parallel processing unit 1002.

The graphics processing pipeline 1600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1002. The API provides an abstraction for a programmer that lets a programmer utilize specialized graphics hardware, such as the parallel processing unit 1002, to generate the graphical data without requiring the programmer to utilize the specific instruction set for the parallel processing unit 1002. The application may include an API call that is routed to the device driver for the parallel processing unit 1002. The device driver interprets the API call and performs various operations to respond to the API call. In some instances, the device driver may perform operations by executing instructions on the CPU. In other instances, the device driver may perform operations, at least in part, by launching operations on the parallel processing unit 1002 utilizing an input/output interface between the CPU and the parallel processing unit 1002. In an embodiment, the device driver is configured to implement the graphics processing pipeline 1600 utilizing the hardware of the parallel processing unit 1002.

Various programs may be executed within the parallel processing unit 1002 in order to implement the various stages of the graphics processing pipeline 1600. For example, the device driver may launch a kernel on the parallel processing unit 1002 to perform the vertex shading 1606 stage on one streaming multiprocessor 1300 (or multiple streaming multiprocessor 1300 modules). The device driver (or the initial kernel executed by the parallel processing unit 1002) may also launch other kernels on the parallel processing unit 1002 to perform other stages of the graphics processing pipeline 1600, such as the geometry shading 1610 stage and the fragment shading 1616 stage. In addition, some of the stages of the graphics processing pipeline 1600 may be implemented on fixed unit hardware such as a rasterizer or a data assembler implemented within the parallel processing unit 1002. It will be appreciated that results from one kernel may be processed by one or more intervening fixed function hardware units before being processed by a subsequent kernel on a streaming multiprocessor 1300.

LISTING OF DRAWING ELEMENTS

102 serializer
104 transmitter
106 communication link
108 receiver
110 clock and data recovery
112 deserializer
114 FIR filter
116 equalizer
202 memory
402 block
404 block
406 block
408 block
410 block
502 inverse FIR filter
504 floating tap placement logic
602
604
606
608
610
802 block
804 block
806 decision block
808 block
810 block
1002 parallel processing unit

1004 I/O unit
1006 front-end unit
1008 scheduler unit
1010 work distribution unit
1012 hub
1014 crossbar
1016 NVLink
1018 interconnect
1020 memory
1100 general processing cluster
1102 pipeline manager
1104 pre-raster operations unit
1106 raster engine
1108 work distribution crossbar
1110 memory management unit
1112 data processing cluster
1114 primitive engine
1116 M-pipe controller
1200 memory partition unit
1202 raster operations unit
1204 level two cache
1206 memory interface
1300 streaming multiprocessor
1302 instruction cache
1304 scheduler unit
1306 register file
1308 core
1310 special function unit
1312 load/store unit
1314 interconnect network
1316 shared memory/L1 cache
1318 dispatch
1400 processing system
1402 central processing unit
1404 switch
1406 parallel processing module
1500 exemplary processing system
1502 communications bus
1504 main memory
1506 input devices
1508 display devices
1510 network interface
1600 graphics processing pipeline
1602 output data
1604 data assembly
1606 vertex shading
1608 primitive assembly
1610 geometry shading
1612 viewport SCC
1614 rasterization
1616 fragment shading
1618 raster operations
1620 input data Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device.

Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter). Logic symbols in the drawings should be understood to have their ordinary interpretation in the art in terms of functionality and various structures that may be utilized for their implementation, unless otherwise indicated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

Although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the intended invention as claimed. The scope of inventive subject matter is not limited to the depicted embodiments but is rather set forth in the following Claims.

What is claimed is:

1. A data transceiver comprising:
a transmitter configured with a digital filter;
a receiver configured with an equalizer;
logic to:
measure a combined pulse response to a symbol generated by the transmitter at an output of the equalizer;
adjust the combined response by an impulse response of the digital filter to generate an adjusted pulse response; and
modify the digital filter with one or more floating taps based on the adjusted pulse response.

2. The data transceiver of claim 1, wherein the digital filter is a finite impulse response filter.

3. The data transceiver of claim 1, wherein the floating taps are post-cursor taps.

4. The data transceiver of claim 3, wherein the floating taps are sparsely located.

5. The data transceiver of claim 1, wherein the adjusted pulse response is generated by convolving the combined pulse response with an inverse impulse response of the digital filter.

6. The data transceiver of claim 1, wherein modifying the digital filter with one or more floating taps based on the adjusted pulse response comprises:
generating a set of group placement combinations of P>1 floating taps for the digital filter; and selecting from the set a combination of floating tap group placements that results in a highest distortion reduction by the digital filter.

7. The data transceiver of claim 6, wherein modifying the digital filter with one or more floating taps based on the adjusted pulse response further comprises:

configuring the digital filter with a single grouping of N≥1 consecutive floating taps from the selected combination of floating tap group placements, where N is less than all floating taps in the selected combination.

8. The data transceiver of claim 7, wherein modifying the digital filter with one or more floating taps based on the adjusted pulse response further comprises:

on condition that a number of floating taps that remain for placement is less than or equal to P, configuring the digital filter with each grouping of N≥1 consecutive taps from the selected combination of tap group placements.

9. A data transmitter comprising:

a digital filter;

logic to:

measure a combined pulse response of a communication link and a receiver coupled to the communication link;

remove an impulse response of the digital filter from the combined pulse response to generate an adjusted pulse response; and add floating taps to the digital filter at locations based on the adjusted pulse response.

10. The data transmitter of claim 9, wherein the digital filter is a finite impulse response filter.

11. The data transmitter of claim 9, wherein the floating taps are post-cursor taps on the digital filter.

12. The data transmitter of claim 11, wherein the floating taps are added at a number of unit intervals greater than one from a main cursor of the digital filter.

13. The data transmitter of claim 9, wherein the adjusted pulse response is generated by convolving the combined pulse response with an inverse impulse response of the digital filter.

14. The data transmitter of claim 9, wherein modifying the digital filter with one or more floating taps based on the adjusted pulse response comprises:

generating a set of group placement combinations of P>1 floating taps for the digital filter; and selecting from the set a combination of floating tap group placements that results in a highest distortion reduction by the digital filter.

15. The data transmitter of claim 14, wherein modifying the digital filter with one or more floating taps based on the adjusted pulse response further comprises:

configuring the digital filter with a single grouping of N≥1 consecutive floating taps from the selected combination of floating tap group placements, where N is less than all floating taps in the selected combination.

16. The data transmitter of claim 15, wherein modifying the digital filter with one or more floating taps based on the adjusted pulse response further comprises:

on condition that a number of floating taps that remain for placement is less than or equal to P, configuring the digital filter with each grouping of N≥1 consecutive taps from the selected combination of tap group placements.

17. A process for calibrating a data transmitter, the process comprising:

measuring a combined pulse response to a symbol generated by the transmitter at an output of an equalizer;

adjusting the combined pulse response by an impulse response of a pre-distortion digital filter for the transmitter to generate an adjusted pulse response; and modifying the pre-distortion digital filter with one or more floating taps based on the adjusted pulse response.

18. The process of claim 17, further comprising:

generating a set of group placement combinations of P>1 floating taps for the pre-distortion digital filter; and selecting from the set a combination of floating tap group placements that results in a highest distortion reduction by the pre-distortion digital filter at the output of the equalizer.

19. The process of claim 18, further comprising:

configuring the pre-distortion digital filter with a single grouping of N≥1 consecutive floating taps from the selected combination of floating tap group placements, where N is less than all floating taps in the selected combination.

20. The process of claim 19, further comprising:

on condition that a number of floating taps that remain for placement is less than or equal to P, configuring the pre-distortion digital filter with each grouping of N≥1 consecutive taps from the selected combination of tap group placements.

* * * * *